United States Patent
Borella et al.

(10) Patent No.: US 7,082,130 B2
(45) Date of Patent: Jul. 25, 2006

(54) SYSTEM AND METHOD FOR POINT-TO-POINT PROTOCOL DEVICE REDUNDANCEY

(75) Inventors: Michael S. Borella, Naperville, IL (US); Chandra Warrier, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 97 days.

(21) Appl. No.: 10/693,294

(22) Filed: Oct. 24, 2003

(65) Prior Publication Data
US 2004/0095881 A1 May 20, 2004

Related U.S. Application Data

(63) Continuation-in-part of application No. 10/170,900, filed on Jun. 13, 2002.

(51) Int. Cl.
H04L 12/28 (2006.01)
(52) U.S. Cl. ............... 370/389; 370/219; 370/338; 455/435
(58) Field of Classification Search ........... 370/320, 370/471, 331–338, 389–396, 349, 219, 328; 375/296, 224, 144–148, 346, 225; 455/502, 455/524, 418, 423, 435, 419, 433, 518, 436, 455/456.1, 414.1, 403, 439, 450
See application file for complete search history.

(56) References Cited

U.S. PATENT DOCUMENTS

| | | | |
|---|---|---|---|
| 6,708,031 B1* | 3/2004 | Purnadi et al. ............. 455/436 |
| 6,795,705 B1* | 9/2004 | Warrier et al. ........... 455/435.1 |
| 6,822,952 B1* | 11/2004 | Abrol et al. ................. 370/338 |
| 2003/0021252 A1* | 1/2003 | Harper et al. ............... 370/338 |
| 2003/0086423 A1* | 5/2003 | Hsu ........................... 370/390 |
| 2003/0235168 A1* | 12/2003 | Sharma et al. ............. 370/338 |
| 2004/0114553 A1* | 6/2004 | Jiang et al. ................. 370/328 |
| 2004/0214574 A1* | 10/2004 | Eyuboglu et al. ........... 455/439 |

\* cited by examiner

Primary Examiner—Chieh M. Fan
Assistant Examiner—Prenell Jones
(74) Attorney, Agent, or Firm—Felix L. Fischer

(57) ABSTRACT

A system and methods are shown for providing packet data serving node (PDSN) redundancy. One exemplary method includes providing an access node with a plurality of packet data serving nodes and at least one system manager, establishing an N to 1 redundancy of active to standby PDSNs. Upon establishing a communications session with a mobile node, each active PDSN provides state updates to the standby PDSN including only non-recoverable data. Upon failure of any active PDSN, the standby PDSN reassigned as an active PDSN replacing the failed unit and assuming the communications session with the mobile node. The remaining active PDSNs are notified of the reassignment and transmission of updated state data is discontinued.

31 Claims, 24 Drawing Sheets

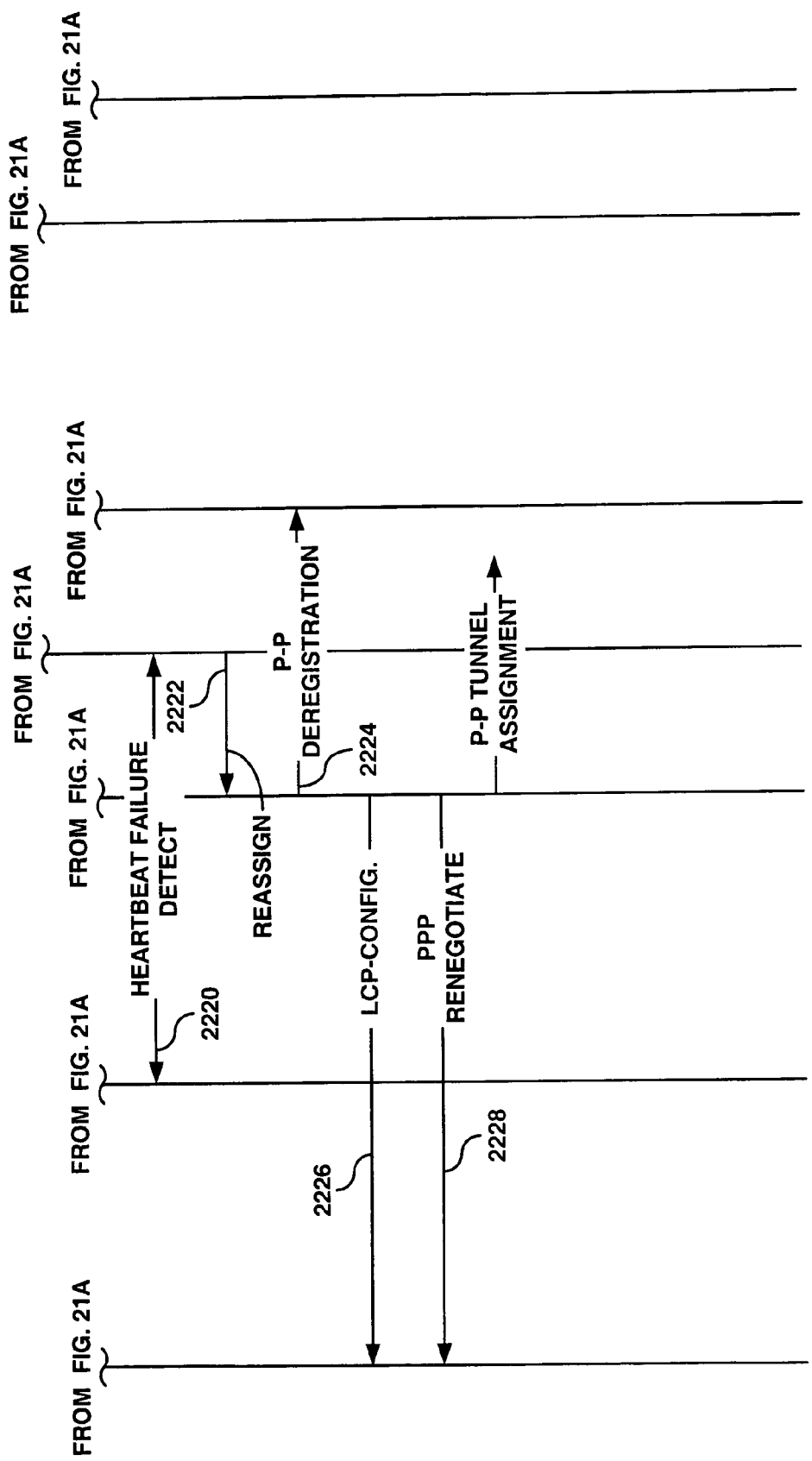

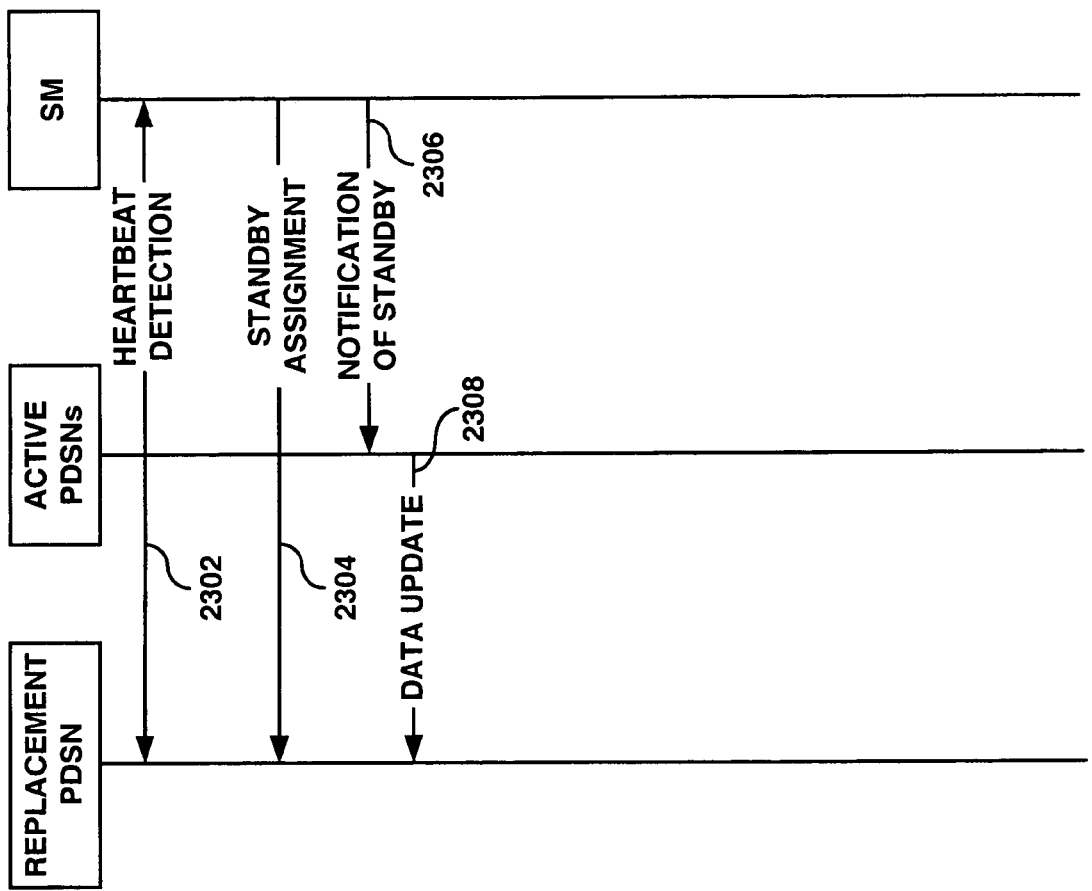

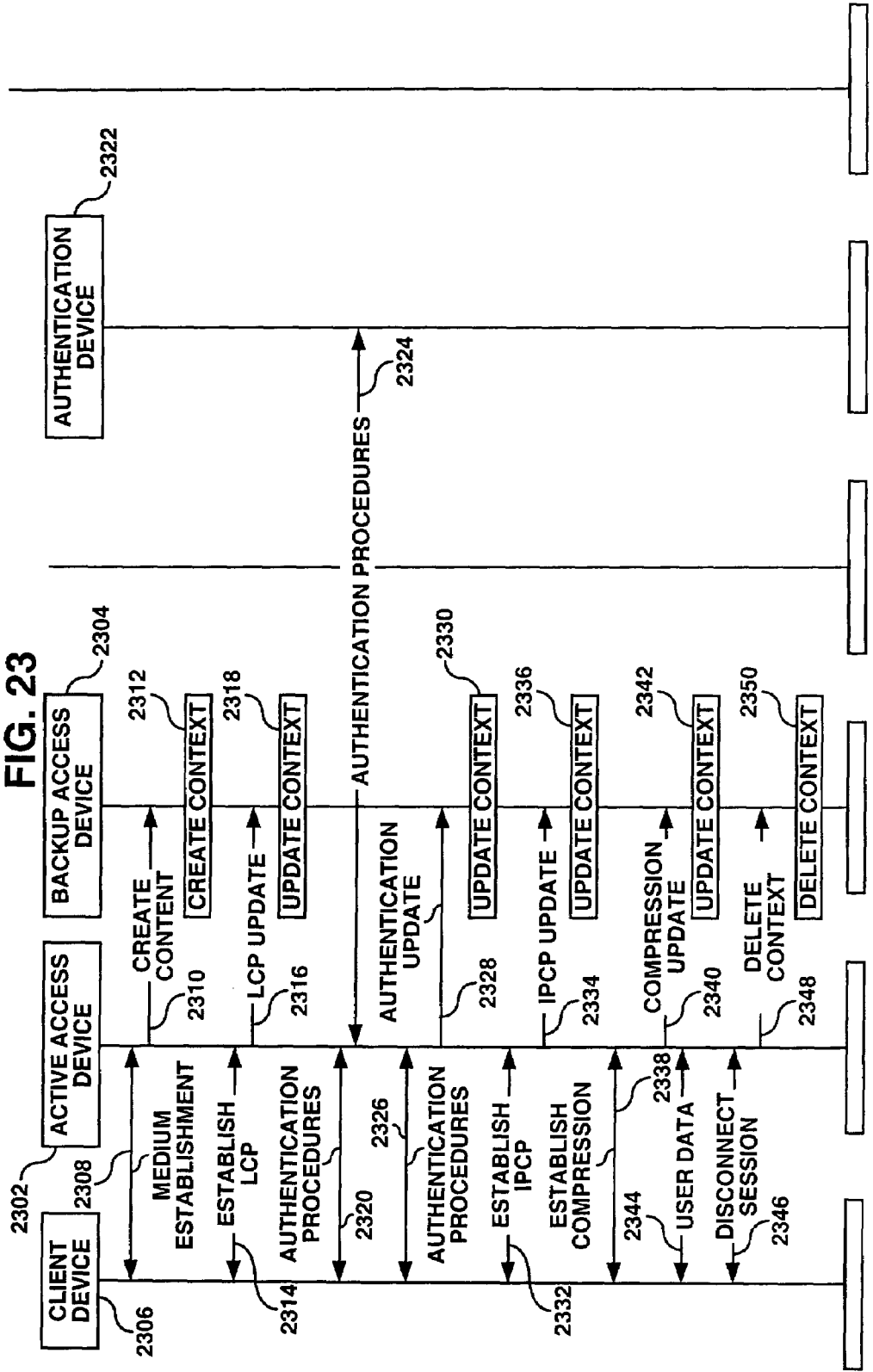

SYSTEM AND METHOD FOR POINT-TO-POINT PROTOCOL DEVICE REDUNDANCEY

CROSS-REFERENCE TO RELATED APPLICATIONS

This application is a continuation-in-part of U.S. patent application Ser. No. 10/170,900 filed on Jun. 13, 2002 entitled SYSTEM AND METHOD FOR PACKET DATA SERVING NODE LOAD BALANCING AND FAULT TOLERANCE having a common assignee with the present application.

BACKGROUND OF THE INVENTION

1. Field of the Invention

The present invention relates to communications in mobile Internet Protocol ("IP") networks. More particularly, it relates to management of Point-to-Point Protocol devices including specifically packet data serving nodes with N−1 redundancy and duplicate storage of only non-recoverable state data.

2. Description of the Related Art

Public packet switched networks can be used to carry traffic to and from a mobile communications device (a mobile node), such as a mobile host, or a router that changes its point of attachment from one network to another. The basic architecture of mobile IP data networking is known in the art and described in several publications, including the Request for Comments ("RFC") document RFC 2002 (1996) (hereinafter "RFC 2002"), which is currently available from the Internet Engineering Task Force ("IETF") at www.ietf.org for more information. Persons skilled in the art of mobile IP data networking are familiar with that document and devices used to implement mobile IP data networking in practice.

In a mobile IP communication network, a mobile node communicates with a target host on an IP network by means of two devices, a "foreign agent" and a "home agent". One example of a mobile IP network that describes that type of communication is presented in U.S. patent application Ser. No. 09/354,659 entitled "Mobile Internet Protocol (IP) Networking with Home Agent and/or Foreign Agent Functions Distributed Among Multiple Devices," the entire content of which is incorporated herein by reference. Typically, the foreign agent functionality is incorporated into a router on a mobile node's visited network. The foreign agent provides routing services for the mobile node while it is registered with the home agent. For example, the foreign agent de-tunnels and delivers datagrams that were tunneled by the mobile node's home agent to the mobile node.

The home agent is typically incorporated into a router on a mobile node's home network. The home agent maintains current location information for the mobile node. When one or more home agents are handling calls for multiple mobile nodes simultaneously, the home agents are providing, in essence, a service analogous to a virtual private network service. Each mobile node is typically associated with a separate home network and the routing path from that home network, through the home agent, to the foreign agent and mobile node is like a virtual private network for the mobile node.

Mobile IP requires link layer connectivity between a mobile node (a mobile entity) and a foreign agent. However, in some systems, the link layer from the mobile node may terminate at a point distant from the foreign agent. Such networks are commonly referred to as third generation wireless networks. FIG. 1 is a block diagram illustrating a network architecture that is typically employed in the third generation wireless networks. Referring to FIG. 1, a mobile node 10 communicates with a target host 34 on an IP network 30 by means of three devices, a radio network node 16, a packet data serving node 18, and a home agent node 24. The physical layer of the mobile node 10 terminates on the radio network node 16, and the foreign agent's functionality resides on the packet data serving node 18. Typically, the radio network node 16 relays link layer protocol data between the mobile node 10 and the packet data serving node 18, and the packet data serving node 18 establishes, maintains and terminates the link layer to the mobile node 10. For example, the mobile node 10 may be linked to the radio network node 16 via a communication link on a radio access network.

The packet data serving node 18 provides routing services for the mobile node 10 while it is registered with the home agent 24. The packet data serving node 18 de-tunnels and delivers datagrams that were tunneled from the home agent node 24 via an IP network 20 to the mobile node 10. The communication traffic exchanged between the packet data serving node 16 and the home agent 24 includes data traffic as well as control traffic. The control traffic includes registration request or registration reply messages. The control and data traffic is routed via the packet data serving node 16 and terminates at the mobile node 10. The target host 34 may be connected to a home network 26 by any number of networks, such as the IP networks 20 and 30, or it may be directly located on the home network 26. Alternatively, the target host 34 may be connected to the home network by other types of packet switched networks.

The home agent 24 may be implemented on a router on the mobile node's home network 26. The home agent 24 maintains current location information data for the mobile terminal 10 such as foreign agent address, a Network Access Identifier ("NAI") of the mobile node 10, a mobile home address and a secret key shared between the home agent and the mobile node 10. The home agent tunnels data from the target host 34 to the packet data serving node 18, and similarly provides tunneling services in the reverse direction. More information on point-to-point tunnels, such as a Layer 2 Tunneling Protocol ("L2TP") tunnel may be found in the RFC 2661, currently available at www.ietf.org.

The home agent 24, therefore, typically implements at least two distinct tasks for the mobile node 10. First, the home agent 24 performs a registration and authentication process to determine whether the mobile node 10 is authorized to access the home network 26. This may involve, for example, checking the identification of the mobile entity, such as through the use of the mobile entity's unique serial number, NAI, or manufacturing number, password authentication, and possibly checking whether the mobile entity's account is current and paid. The home agent's registration and authentication function may be performed in conjunction with, or with the assistance of, a second device, such as an authentication, authorization and accounting ("AAA") server such as a Remote Authentication Dial-In User Service ("RADIUS") server. More information on a RADIUS server may be found on in the RFC-2138, which is currently available at www.ietf.org for more information. As is known to those skilled in the art, the registration process includes receiving and processing registration request messages from the packet data serving node 18 and sending registration reply messages to the packet data serving node 18.

The packet data serving node 18 also performs four distinct tasks for the mobile node 10. The packet data serving node 18 handles registration and session control for the mobile node 10, including sending registration request messages to the home agent 24 and processing registration reply messages received from the home agent 24. Additionally, the packet data serving node 18 has tunneling responsibilities for forwarding data packets to the home agent 24 for ultimate transmission to the target host 34, as well as de-tunneling data from the home agent 24 for ultimate delivery to the mobile node 10. Further, the packet data serving node 18 provides authentication, authorization and accounting services for the mobile node 10. The packet data serving node may perform the authentication, authorization and accounting functions in conjunction with, or with the assistance of, an authentication, authorization and accounting server, such as a RADIUS server. Additionally, the packet data service node 18 may provide Pi/FA interfaces that provide signaling/data interfaces to/from an AAA server, mobile switching center ("MSC") or a home agent.

When the mobile node 10 initiates a communication session with the radio network node 16 by sending a call setup indication to the radio network node 16 across a radio communication link, the radio network node 16 initiates a registration process with the packet data serving node 18. Typically, the radio network node 16 is configured with a number of packet data serving nodes that may provide services to the mobile node 10. In the known prior art, the radio network node 16 has no status information for any of the packet data serving nodes that are configured to serve the new communication sessions. Thus, when the radio network node 16 initiates the registration process for the mobile node 10, the radio network node 16 randomly selects a packet data serving node for the mobile node 10. In such a system, some of the packet data serving nodes available to the radio network node may be quickly overloaded while the other ones are rarely used. Further, if a number of consecutive packet data serving nodes to which the radio network node 16 sends registration requests are overloaded, such packet data serving nodes will most likely reject registration requests from the radio network node 16, thus, resulting in service delays for the mobile node 10.

The load balancing of user sessions from mobile nodes is an important capability. There are several currently existing methods that may be used for load balancing of user sessions. Typically, a radio network node is programmed with a number of IP addresses of packet data serving nodes, and the radio network node may select one of them to serve an incoming session from a mobile node. According to one existing method, a radio network node may include a packet control function that may calculate a hash value based on, for instance, an International Phone Subscriber Interface (such as a phone number) of a mobile node, and the calculated hash may be used to select a packet data serving node's IP address. The disadvantage to this scheme is that the algorithm does not take into account the current load of each packet data serving node.

According to another alternative method, the packet control function may employ a round robin mechanism to select a packet data serving node. In such an embodiment, the packet control function may assign each subsequent arriving session to the next packet data serving node in its list, wrapping around to the first packet data serving node when the last packet data serving node is reached. The round robin mechanism distributes calls between packet data serving nodes; however, it does not take into account the type of call sessions being forwarded to each packet data serving node, for instance.

Further, according to another method, an external foreign agent control node may select a packet data serving node based on memory usage, or processing power usage of the packet data serving node, for instance. The functionality of the foreign agent control node is described in U.S. patent application Ser. No. 09/881,649 entitled "System and Method for Managing Foreign Agent Selections in a Mobile Internet Protocol Network," the entire content of which is incorporated herein by reference. While the foreign agent control node provides load balancing mechanisms during selection of packet data serving nodes, there are several limitations to its current architecture. First, multiple redundant foreign agent control nodes are not easily supported given a current packet control function selection algorithm. Second, the foreign agent control node requires an additional component to be added to the system architecture, and does not allow user sessions to be saved when a PDSN crashes or otherwise becomes unavailable.

Thus, there is a need for improved system and method for selecting serving nodes, such as packet data serving nodes or home agents, in a mobile IP network. Redundancy and failover capability for the packet data serving nodes constitutes an important element to provide consistent uninterrupted service for a mobile node.

SUMMARY OF THE INVENTION

A system and method for redundancy with failover capabilities of packet data serving nodes incorporates an N−1 relationship for active PDSNs with a standby PDSN in a mobile Internet Protocol network, is accomplished by providing an access node with a plurality of N+1 packet data serving nodes and at least one system manager. From the N+1 packet data serving nodes, one packet data serving node is selected as a standby for the remaining N active packet data serving nodes. When a registration request is received from a radio node to establish a communication session between a packet data serving node and a mobile node, a packet data serving node is selected and a registration reply message is sent from the first packet data serving node to the radio node. A communication session between the mobile node and the selected packet data serving node is established and non-recoverable state data is transmitted from the selected packet data serving node to the standby packet data serving node. The standby packet data serving node comparably receives state data from all of the N active packet data serving nodes. Updating the non-recoverable state data from the each selected packet data serving node to the standby packet data serving node is accomplished periodically, and upon failure of a selected packet data serving node the communication session is transferred to the standby packet data serving node which assumes the role of the active packet data serving node, discarding all state data for the N−1 non-failing packet data serving nodes, and recovering all dynamic state data during continuing communications with the mobile node.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIGS. 21a and 21b is are block diagrams of a message sequence scenario for failover transfer from the active PDSN to the standby PDSN for failure of the anchor and target PDSN respectively; and FIG. 22 is a block diagram of a message sequence scenario illustrating replacement and reassignment of a failed PDSN as the standby PDSN.

FIG. 23 is a block diagram of a message sequence scenario illustrating generic communication between an active PPP device and its standby PPP device for updating call parameters for backup.

DETAILED DESCRIPTION OF THE INVENTION

Figure 2:
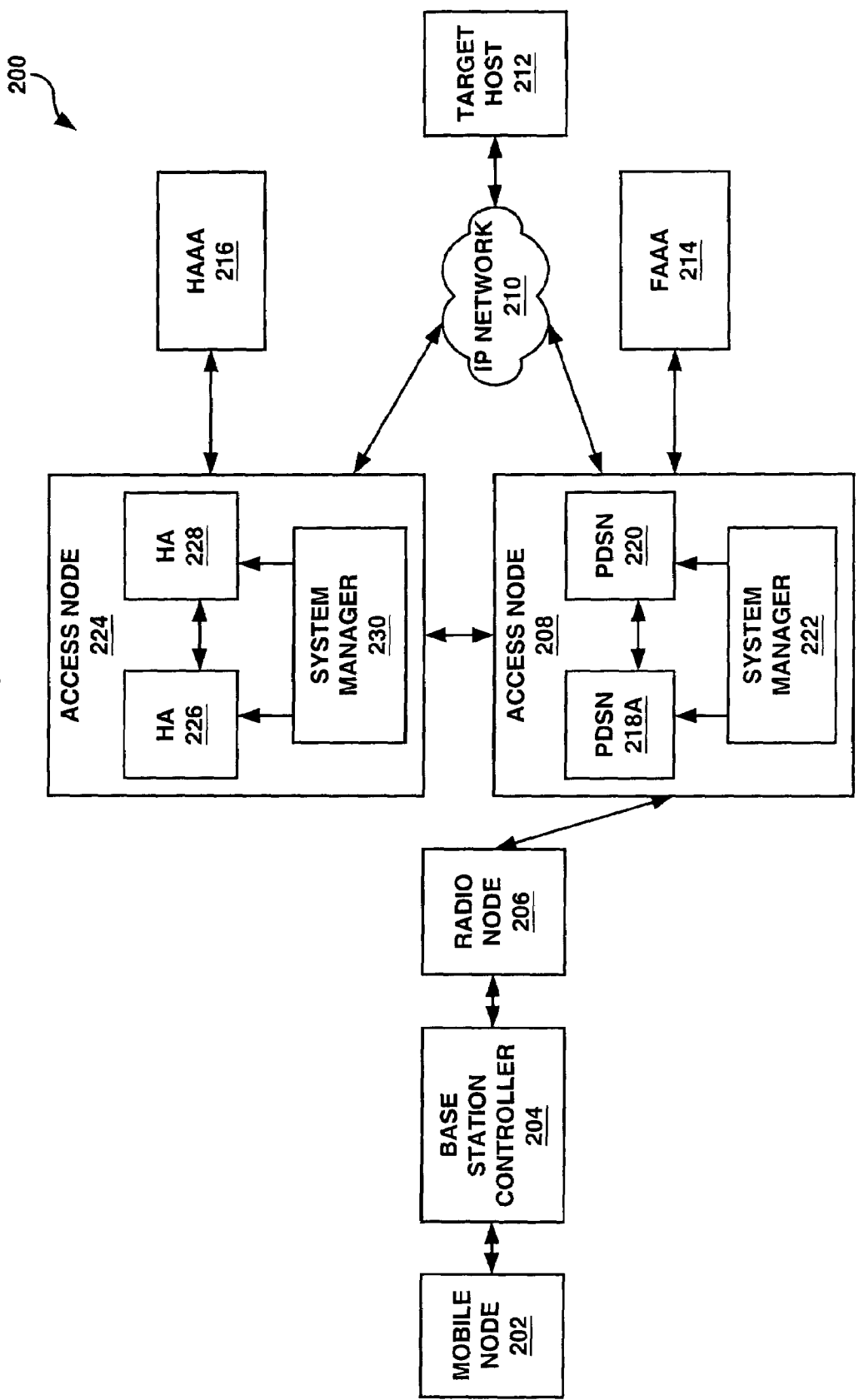
FIG. 2 is a functional block diagram illustrating an embodiment of a network system suitable for application in the present invention.

FIG. 2 is a functional block diagram illustrating an embodiment of a network system 200 suitable for application in the present invention for selecting foreign agents and home agents for mobile nodes in a mobile IP network. It should be understood that this and other arrangements and processes described herein are set forth for purposes of example only, and other arrangements and elements (e.g., interfaces, functions, order of elements, etc.) can be used instead and some elements may be omitted altogether. Further, as in most telecommunications applications, those skilled in the art will appreciate that many elements described herein are functional entities that may be implemented as discrete components or in conjunction with other components, in any suitable combination or location.

As shown in FIG. 2, the system 200 includes a mobile node 202, a base station controller 204, a radio node 206, access nodes 208 and 224, an IP network 210, a foreign authentication, authorization, and accounting ("FAAA") server 214, a home authentication, authorization, and accounting ("HAAA") server 216, and a target host 212. The mobile node 202 may take any suitable form, such as, for instance, a telephone, a lap top computer, a fax, or a personal digital assistant ("PDA"), for instance. Although only a single mobile node is illustrated, it should be understood that multiple mobile nodes may be present as well.

The mobile node 202 is connected to the base station controller 204 via a base station (not shown). The base station controller 204 may reside on a radio network such as a CDMA radio network. The base station controller 204 is coupled to the radio node 206. The radio node 206 may include a packet control function ("PCF") that selects a PDSN for a new incoming user communication session. For example, the PCF may be preprogrammed with one or more IP addresses of PDSNs.

The radio node 206 communicates with the access node 208. The access node 208 is a multiservice access platform that delivers data services to mobile nodes. According to an exemplary embodiment, the access node 208 includes a plurality of PDSNs, two of which, a PDSN 218 and a PDSN 220, are illustrated in FIG. 2. The PDSNs 218 and 220 communicate with a system manager 222. The system manager 222, among other functions that will be described hereinafter, receives load/status information from each PDSN, and determines PDSN assignment to mobile nodes. Alternatively, as will be described in greater detail below, the system manager 222 may support a distributed load database.

The access node 208 further communicates with the access node 224 including a plurality of HAs, two of which, a HA 226 and a HA 228, are illustrated in FIG. 2. The HAs 226 and 228 communicate with a system manager 230. FIG. 2 illustrates two access nodes, where the access node 208 houses PDSN cards, and the access node 224 houses HA cards. However, it should be understood that the network architecture may include a single access node housing a combination of PDSNs and HAs.

The PDSN 218 is a terminating point for Point-to-Point Protocol ("PPP") sessions from the mobile node 202. The PDSN 218 may also assemble and decapsulate the PPP packets to get the IP packets that are then sent to a HA, such as the HA 226 or 228 on the access node 224. The access nodes 208 and 224 are further coupled to the FAAA 214 and the HAAA 216, respectively. The FAAA 214 may authenticate the mobile user logging onto a PDSN, provide specific configuration options for the user to the PDSN, or provide routing information during a mobile IP registration. The access node 208 is further coupled to the IP network 210 that is then coupled to the target host 212.

The FAAA 214 may act as a proxy for the HAAA 216 in the network service provider's domain since the PDSN cannot directly communicate with the HAAA 216, which is typically located in the home network of the mobile node. In such an embodiment, when the FAAA 214 receives an authentication request from the PDSN 218, the FAAA 214 may send the request to the HAAA 216, and the HAAA 216 may send an authentication response to the FAAA 214 that may then send it back to the PDSN 218. A shared secret may exist between the FAAA 214 and the HAAA 216 for authenticating messages being sent between them.

The HAAA 216 and the access node 224 may reside in the home network of the mobile node 202. The HAAA 216 may authenticate the mobile node registration requests at the home network. The HAAA 216 may also provide to a serving HA configuration parameters for setting up the call session. For example, the configuration parameters may include a security level, a differential service type, or reverse tunneling parameters. The HAAA 216 may also authenticate requests from the FAAA 214 on behalf of the mobile node 202. The FAAA 214 may send requests to the HAAA 216, and the HAAA 216 may authenticate the requests and send responses back to the FAAA 214, which subsequently may forward them to the PDSN 218.

Figure 3:
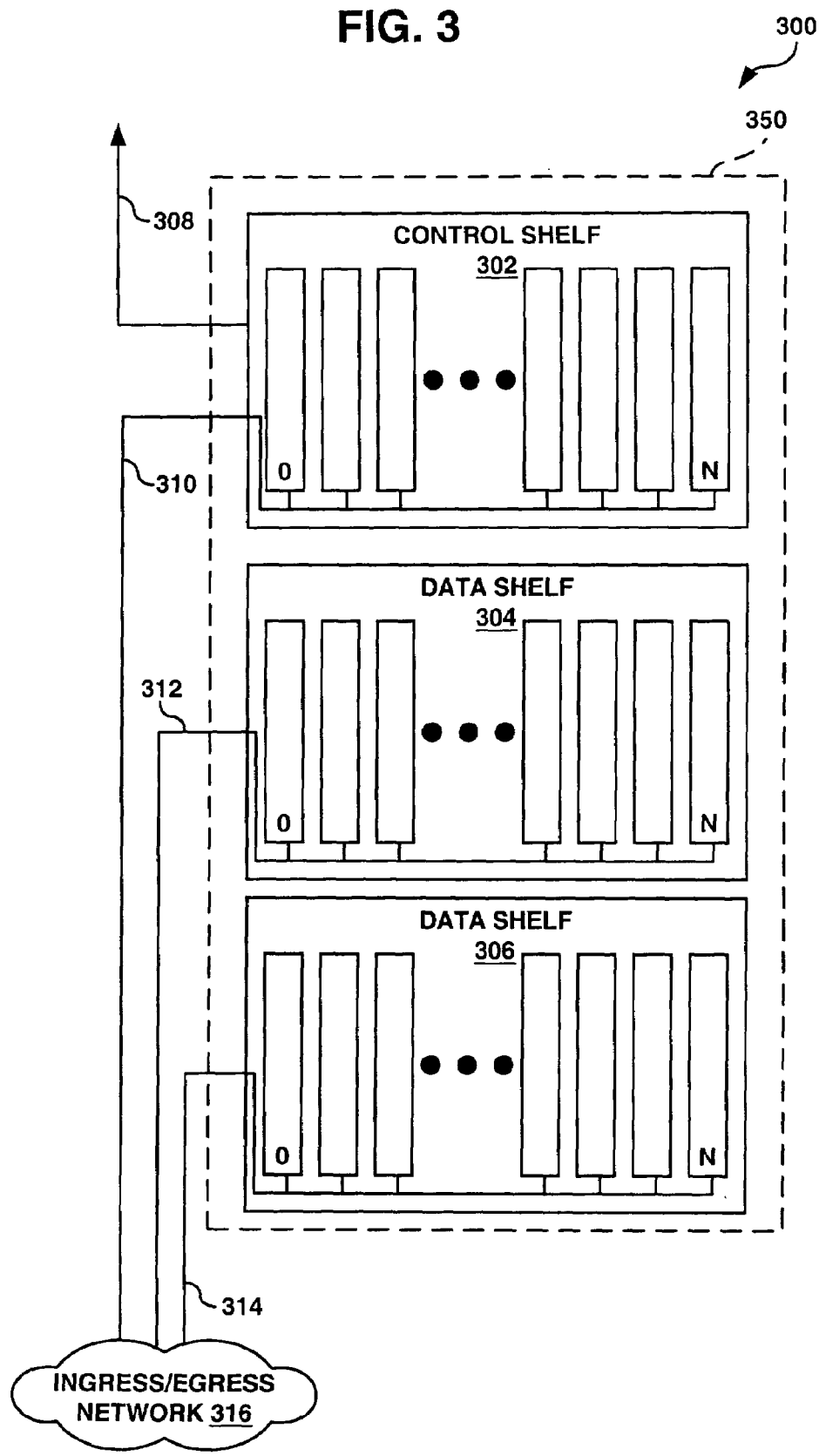
FIG. 3 is a block diagram of a access node in accordance with one embodiment of the present invention.

FIG. 3 is a block diagram 300 illustrating an exemplary embodiment of the access node 208. The access nodes 208 and 224 illustrated in FIG. 3 may be configured on a single rack 350 composed of three shelves, a control shelf 302 and two data shelves 304 and 306. The control shelf 302 is composed of a plurality of cards (0–N) that will be described in greater detail in reference to subsequent Figures. The control shelf 302 may be coupled to a network management system via a network management interface 308, thus, enabling system managers to configure the access nodes 208 and 224 according to their systems' needs. The control shelf 302 further includes an interface 310 to a network 316. In one embodiment, the network 316 may be the CDMA network, the PSTN/TDM, or the ATM network, and a data network, such as the Internet, for instance. However, different networks could also be used. In one embodiment, each card in the control chassis may include two ports, such as two Gigabit Ethernet ports that may be used for communicating data to and from the network 316.

Further, the access nodes 208 and/or 224 illustrated in FIG. 3 include two data shelves 304 and 306 having a plurality of cards (0–N) that will be also described in greater detail in reference to subsequent Figures. The data shelves 304 and 306 include interfaces 312 and 314 to the network 316. It should be understood that FIG. 3 shows only some of the external interfaces and does not illustrate connections between the chassis. Further, it should be understood that the present invention is not limited to a single rack including three chassis, and more chassis could also be added to the single rack.

Figure 4:
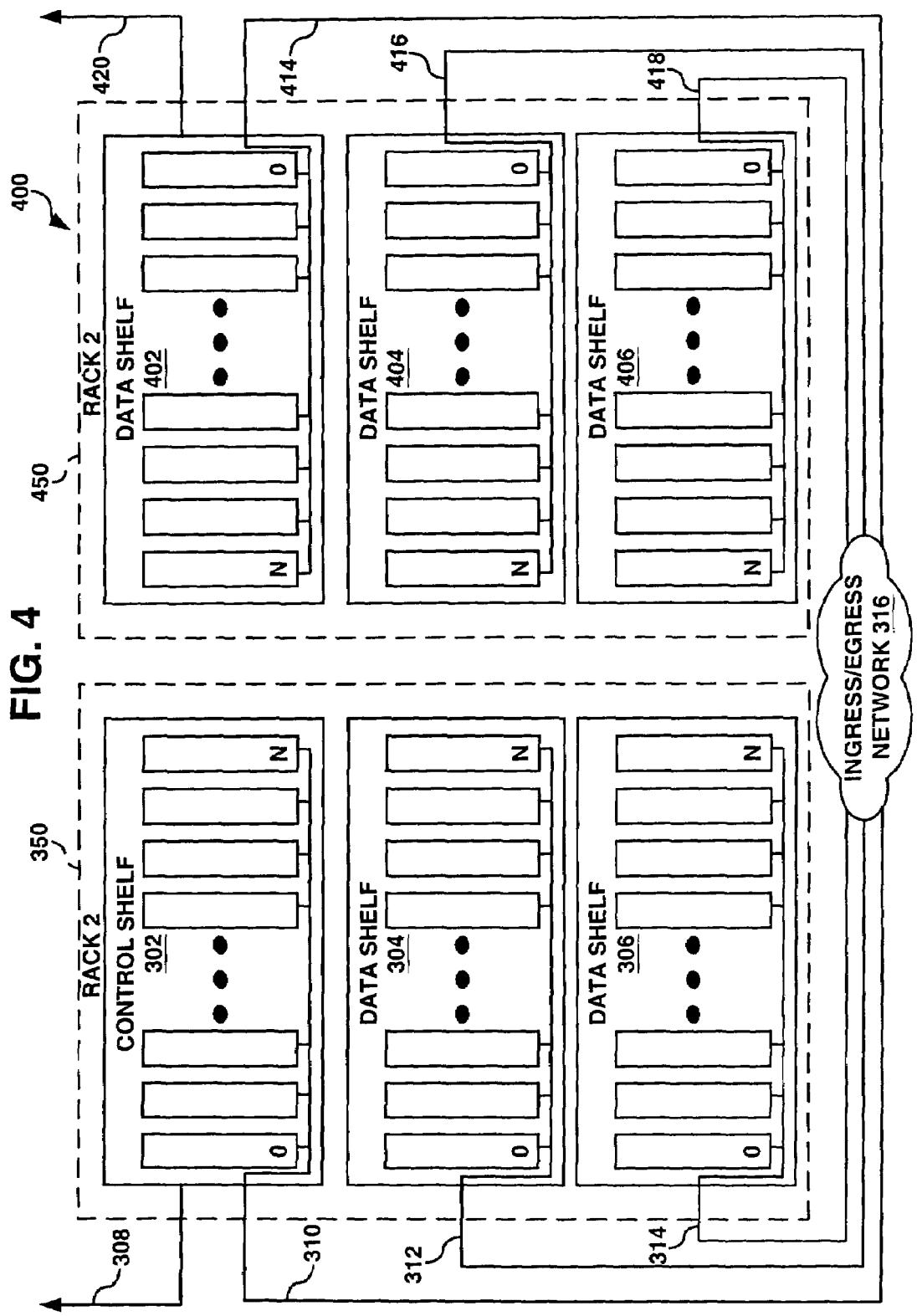
FIG. 4 is a block diagram illustrated a distributed architecture of the access node according to one embodiment of the present invention.

Alternatively, the access node 208 or the access node 224 may be distributed over a plurality of racks. In such a configuration, one control shelf may control a number of data shelves distributed over a plurality of racks. FIG. 4 is a block diagram illustrating a distributed network architecture 400 of the access node 208. In addition to the rack 350 illustrated in FIG. 3, the access node 208 further includes a second rack 450. The second rack 450 contains three data shelves 402, 404, and 406 communicating with the network 316 via interfaces 408, 410, and 412, and, further, communicating with the network 316 via interfaces 414, 416, and 418, respectively. It should be understood that the present invention is not limited to two racks, and more than two racks could also be used.

Figure 5:
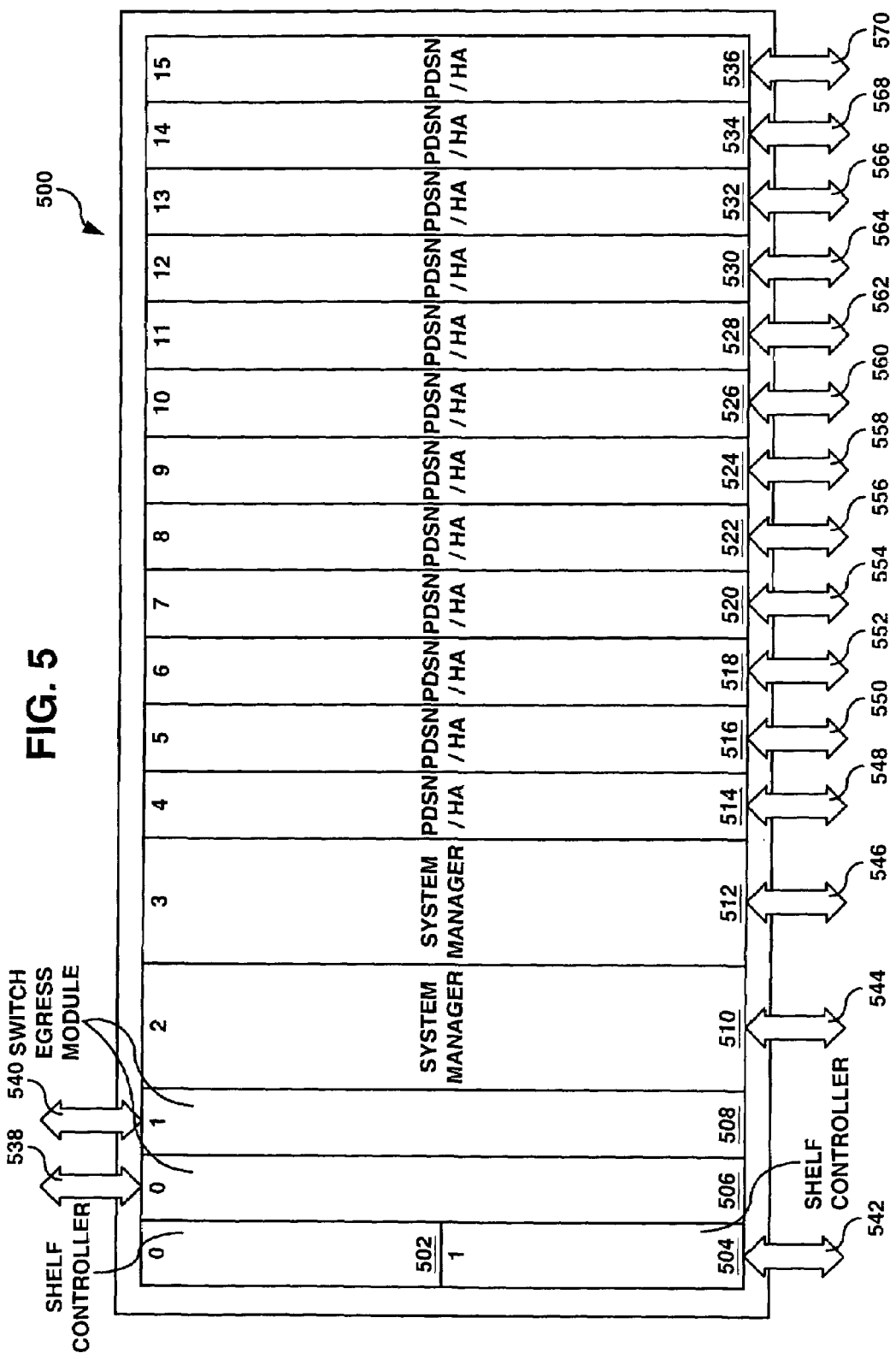
FIG. 5 is a block diagram illustrating a control shelf in the access node according to one embodiment of the present invention.

FIG. 5 is a block diagram illustrating a control shelf 500 according to one exemplary embodiment. The control shelf 500 illustrated in FIG. 5 includes 18 card slots; however, it should be understood that the control shelf is not limited to such a configuration, and it is possible that some slots could remain unused and not get populated with any cards, or fewer card slots could also be used. According to an exemplary embodiment, all components of the control shelf 500 exhibit a redundancy, such as 1 to 1 redundancy, and have failover capabilities. Thus, each component of the control shelf 500 may include an active card and a standby card so that, if the active card fails, the standby card may detect the failure and take over the role of the active card, the embodiments of which will be described in greater detail below.

The control shelf 500 includes two shelf controllers 502 and 504, and each shelf controller is supported on dedicated hardware in the form of two half-height cards located in the leftmost slots of the shelf 500. Further, the control shelf 500 includes two switch egress modules 506 and 508, two system managers 510 and 512, and a plurality of application cards 514–536 illustrated as PDSN/HA cards. It should be understood that the exemplary embodiment is not limited to the control shelf including only PDSN or HA cards, and, alternatively, the control shelf 500 may include a combination of PDSN and HA cards. Further, in alternative embodiments, the shelf controllers and system managers are configured on single or multiple cards to accomplish the system management function.

According to an exemplary embodiment, the shelf controller 502 may be configured as a primary shelf controller, and the shelf controller 504 may be configured as a backup shelf controller. Each shelf controller contains a multi-layer (L2/L3) capable switch that is used to connect the shelf controller to each card slot in the shelf. Further, each shelf controller may have a separate bus to each slot, i.e., a system control bus, hereinafter also referred to as a management bus, that is used to provide intra and inter card control communication, such as management, signaling, and routing, within a single platform. According to one embodiment, for instance, a PDSN card may communicate with one or more system manager cards or another PDSN card using the system control bus. In such an embodiment, data sent from the PDSN is communicated via the system control bus, one or more shelf controller cards to the destination such as one or more system manager cards or the PDSN card.

The shelf controllers 502 and 504 manage the intra-shelf hardware configurations and hardware management. For example, the shelf controllers may read a shelf identifier and a shelf serial number that may then be used to facilitate assignment of internal addresses and allow the system managers to correctly associate specific card locations and configurations. Further, the shelf controllers 502 and 504 provide physical monitoring in the form of presence detection for the other card in the shelf and power sources.

The shelf controllers 502 and 504 may also poll the status of power sources, cooling fans, or temperature sensors provided in the power sources, for instance. Additionally, the shelf controllers 502 and 504 may be responsible for power management within the shelf 500 by evaluating the current requirements of the individual cards against the current available power available in the power sources. The shelf controllers 502 and 504 may communicate with all cards in the shelf 500 via an Ethernet interface 542, such as a 100 Mbps or a faster interface.

The switch egress modules 506 and 508 may be configured as high-speed point-to-point switches (L2/L3) that allow all cards in the slots, such as the system managers and PDSNs/HAs, to communicate with one another on a gigabit link. The switch egress modules 506 and 508 employ switch network interfaces 538 and 540 to communicate data to and from the network.

Further, the control chassis 500 includes the system managers 510 and 512 that may employ any existing or later developed management protocols, such as a Simple Network Management Protocol, to manage multiple chassis from a single point. The system managers 510 and 512 may maintain statistics and status information of all cards in the system by periodically polling each card using SNMP, for instance. The system managers 510 and 512 may communicate with each card via interfaces 544 and 546, respectively. Further, each PDSN or HA card has a network interface, i.e., network interfaces 548–570 illustrated in FIG. 5.

Figure 6:
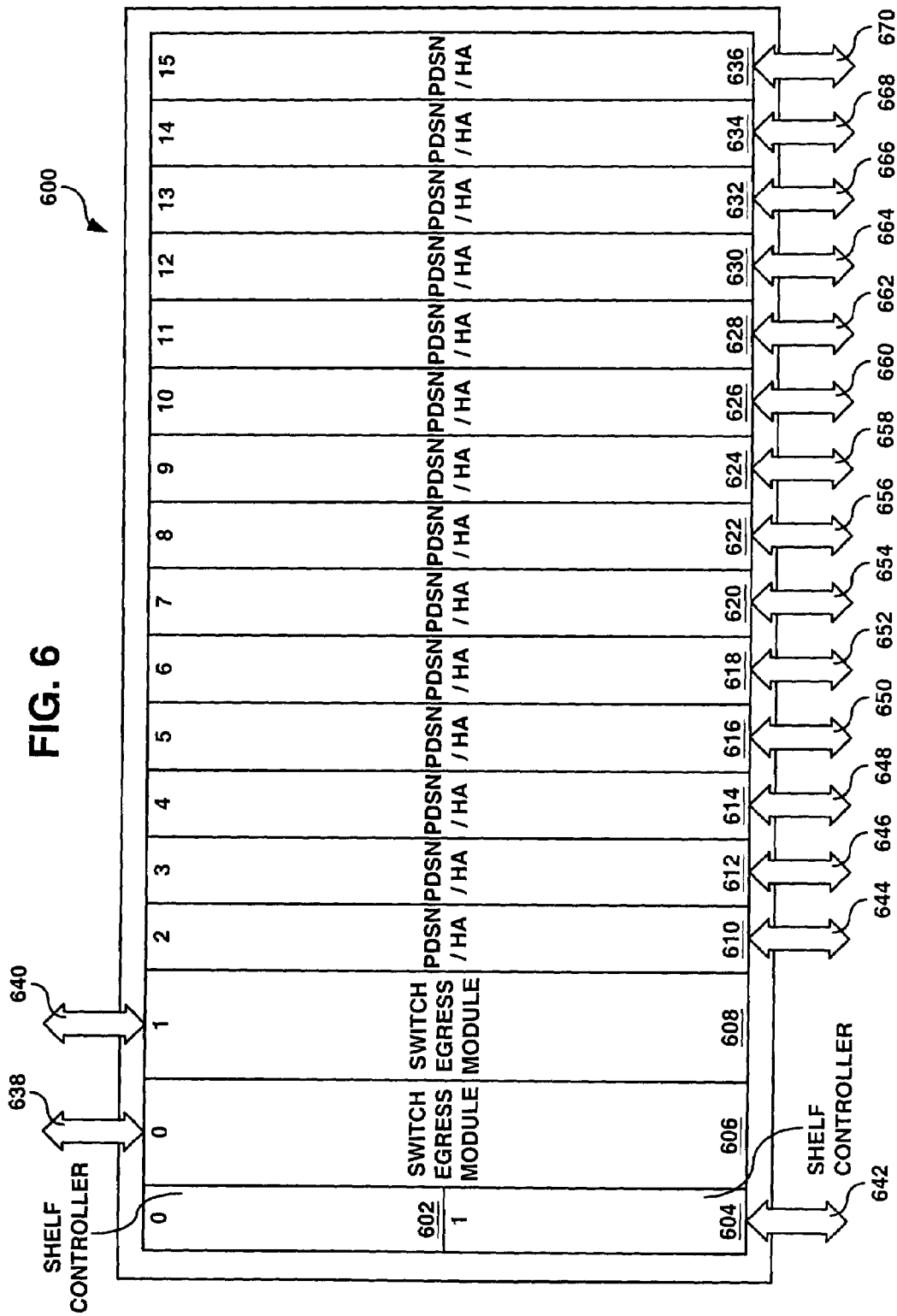
FIG. 6 is a block diagram illustrating a data shelf in the access node according to one embodiment of the present invention.

FIG. 6 is a block diagram illustrating a data shelf 600 according to one exemplary embodiment. The data shelf 500 includes shelf controllers 602 and 604 communicating via an interface 642 with all cards in the shelf 600. The data shelf 600 further includes two switch egress modules 606 and 608 communicating via switch network interfaces 638 and 640, and PDSNs or HAs 610–636 communicating via interfaces 644–670. Similarly to FIG. 5, it should be understood that the data shelf 600 is not limited to including only PDSNs or HAs, and the data shelf 600 could also include a combination of PDSN and HA cards.

Figure 7:
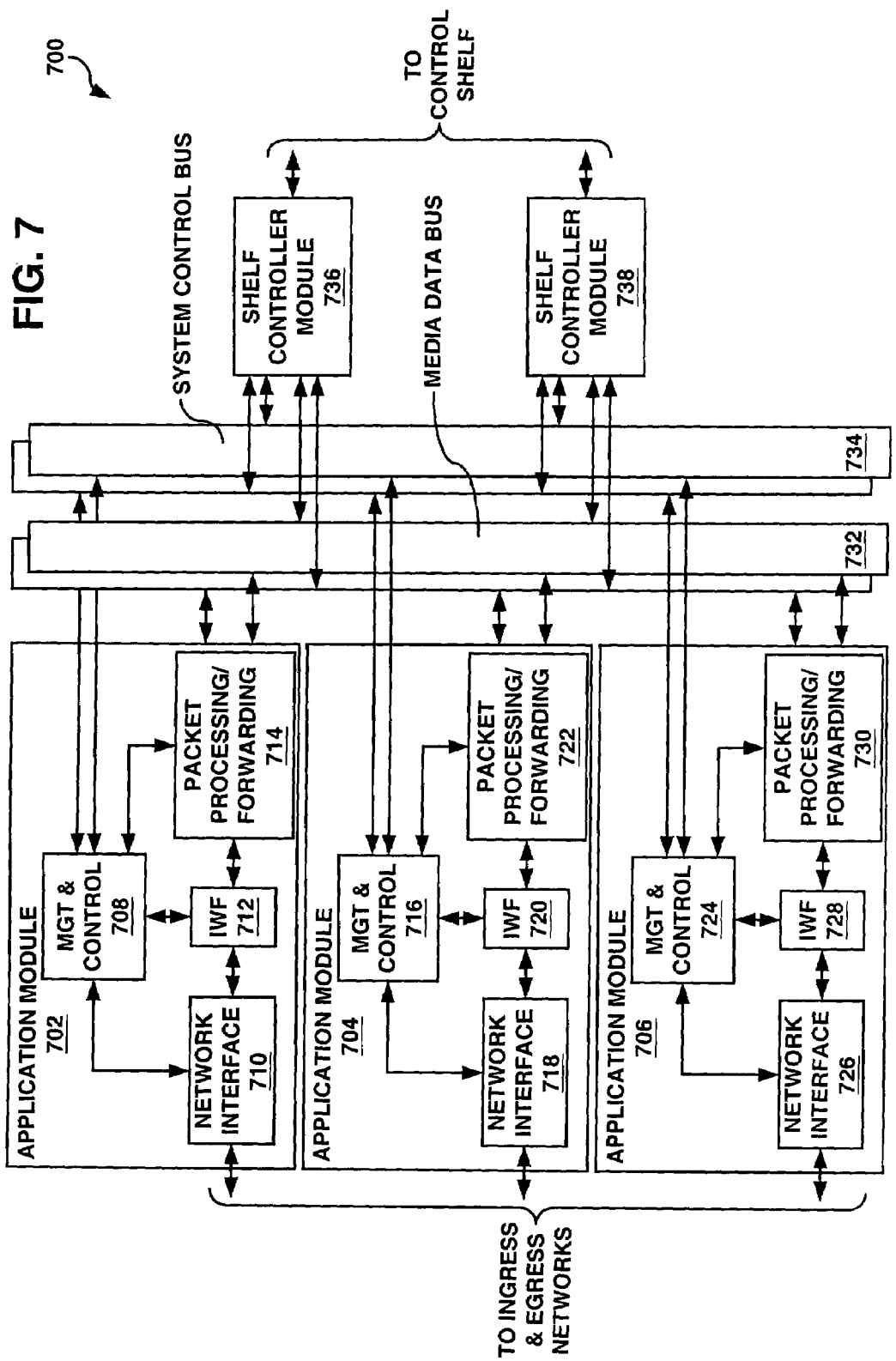
FIG. 7 is a block diagram illustrating a shelf architecture for data-plane connectivity between peer modules within a shelf and for back-plane connectivity with shelf controllers and system managers in the access node according to one embodiment of the present invention.

FIG. 7 is a block diagram illustrating shelf architecture 700 for data-plane connectivity between peer modules within a shelf and for back-plane connectivity with shelf controllers and system managers.

The shelf architecture 700 illustrates three exemplary application modules 702, 704 and 706. The application modules 702–706 include network interfaces 710, 718, and 726, inter-working functions ("IWFs") 712, 720, and 728, management and control interfaces 708, 716, and 724, and packet processing/forwarding modules 714, 722, and 730, respectively. It should be understood that the application modules 702–706 may be a PDSN module or a HA module.

The network interfaces 710, 718, and 726 provide an interface to networks such as the PSTN, a radio network, or a data network, for instance. The management and control interfaces 708, 716, and 724 provide interfaces to management and signaling networks such as an SNMP network, a Session Initiation Protocol ("SIP") network, a H.323 network, or any existing or later developed signaling networks. The management and control interfaces communicate via a system control bus 734 (or a management bus) with shelf controller modules 736 and 738 that transmit management and control messages to a control shelf, such as the control shelf 500 illustrated in FIG. 5.

The system control bus 734 provides intra/inter card control such as management, signaling, and routing communication within a single platform. In one embodiment, the system control bus 734 may be implemented as a switched Fast Ethernet (100 Mbps) system control bus that provides a physically separate and dedicated embedded network to support management and control functions of the platform. The system control bus 734 originates from each of two shelf controller modules in the shelf 700 to each slot, including the peer shelf controller slot. For instance, each shelf controller may be connected to every switch egress and application module in the shelf via one bi-directional 100Base T-TX Ethernet link. Additionally, two shelf controller modules may be connected via one bi-directional 100Base T-TX Ethernet link. In one embodiment, each connection may be configured as a pair of differential traces carrying 100 Mbps 100BaseT-TX Ethernet. Thus, in such an embodiment, each system control bus link may be a 4-wire interface including one pair of TX and one pair of RX Fast Ethernet links. However, it should be understood that different types of links could also be used.

Figure 8:
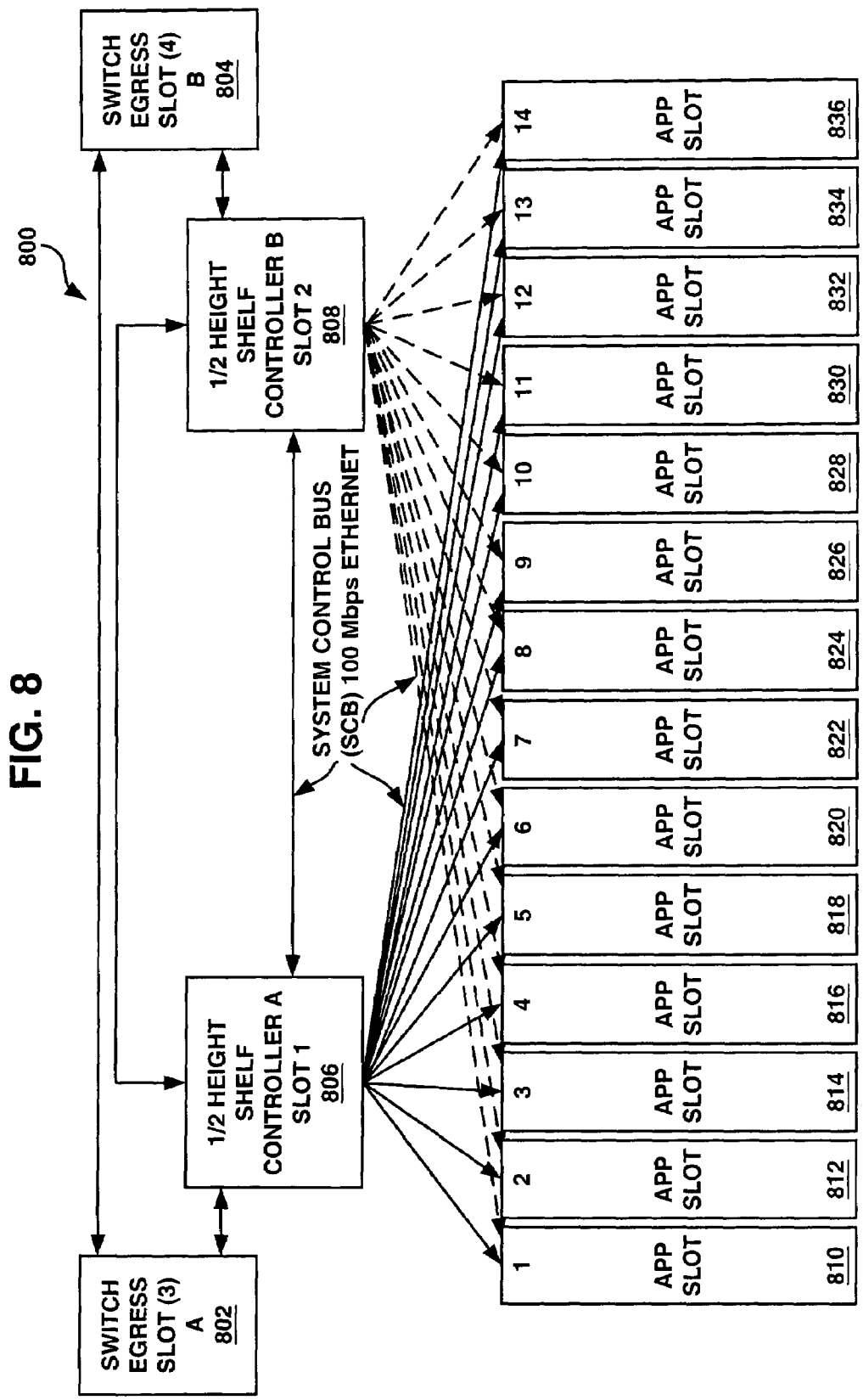
FIG. 8 is a block diagram illustrating exemplary physical interconnections of the system control bus according to one embodiment of the present invention.

FIG. 8 illustrates exemplary physical interconnections of the system control bus 734 according to one exemplary embodiment. As illustrated in FIG. 8, the system control bus 734 interconnects two shelf controllers 806 and 808 to each other, to each switch egress module 802 and 804, as well as each application card 810–836 such as each application slot housing a PDSN or HA card.

Referring back to FIG. 7, each application card and shelf controller is connected to a media data bus 732 (hereinafter also referred to as a switch fabric). The media data bus 732 distributes IP packet traffic within a single shelf. The media data bus 732 may be implemented in a star topology originating from each of the switch egress slots to all other slots on the main backplane, including the peer switch egress slot and two shelf controller slots. In one embodiment, the switched star bus may allow each differential pair to reliably transmit in the Gbps range, such as a 1.25 Gbps range, a 2.5 Gbps range, or a higher/slower range. In one embodiment, each media data bus connection from the switch egress slots may be configured as a dual (TX/RX) point-to-point differential pair (i.e., a spoke). In such an embodiment, the spokes may be distributed so that there are two spokes to the peer switch egress slot, two spokes to each application module slot, and one spoke to each one-half shelf controller slot.

According to one exemplary embodiment, one or more PDSN cards may use the media data bus 732 to communicate with each other or the system manager cards. In such an embodiment, the data being communicated to and from PDSN cards is transmitted via the media data bus 732 through one or more switch egress modules to the intended destination(s), such as the system manager cards or PDSN cards. Additionally, each PDSN card may use the media data bus 732 to send queries and receive authorization responses to/from the FAAA server 214. To send an authorization query, a PDSN card may transmit the authorization query via the media data bus 732 and the switch egress module to the FAAA server 214. Responsively, the PDSN card may receive an authorization response from the FAAA server 214 via the switch egress module and the media data bus. It should be understood that each HA card may also use the media data bus 732 to send and receive authorization information to/from the HAAA server 216, and to communicate data to/from the system manager cards and other HA cards.

Figure 9:
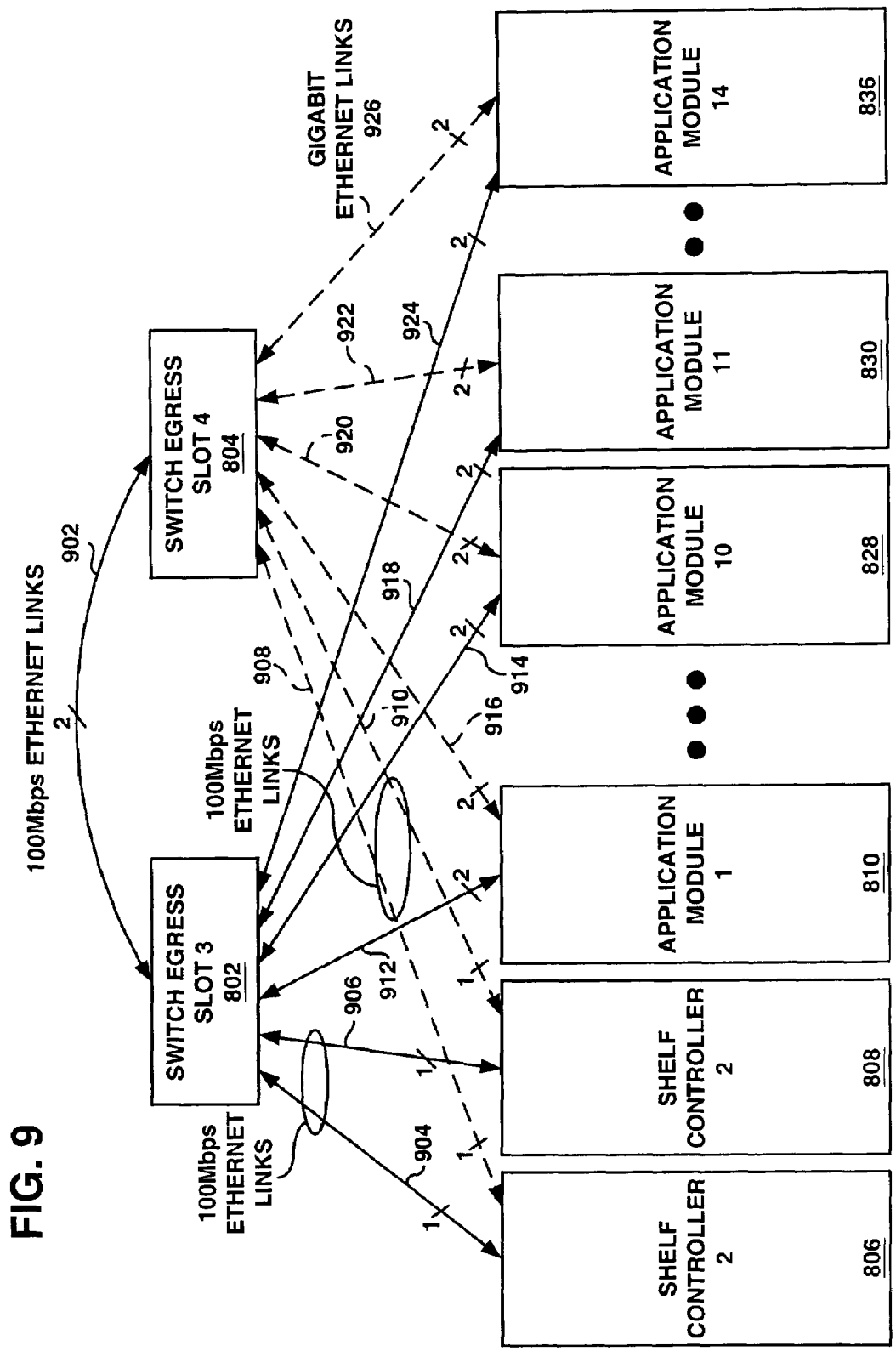
FIG. 9 is a block diagram illustrating physical interconnections of a media data bus according to one embodiment of the present invention.

FIG. 9 is a block diagram illustrating physical interconnections of the media data bus according to one exemplary embodiment. As illustrated in FIG. 9, the switch egress slots 802 and 804 are interconnected via 100 Mbps Ethernet links 902. Further, each switch egress slot is interconnected to each shelf controller 806 and 808 via 100 Mbps Ethernet links 90–910, and to each application module slot via Gbps Ethernet links 912–926. Thus, according to an exemplary embodiment, the switched gigabit Ethernet media data bus provides a physically separate and dedicated embedded network that supports inter card communication within each shelf.

Figure 10:
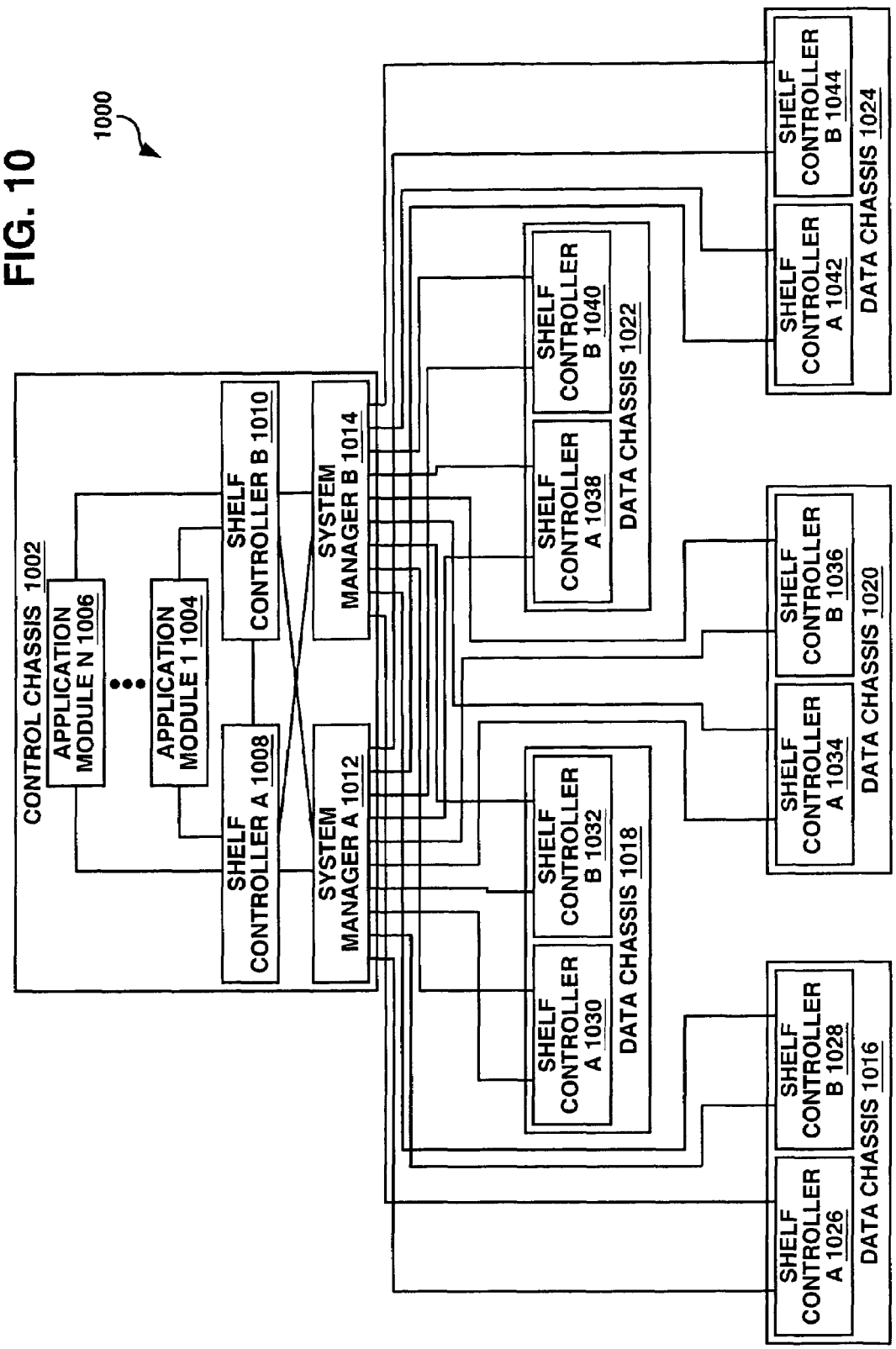
FIG. 10 is a block diagram illustrating an inter-shelf cabling topology according to one embodiment of the present invention.

According to one exemplary embodiment, an access node configuration may consist of six shelves including one control shelf and five data shelves, each of which communicates with the control shelf in order to receive control information, such as signaling and management information. FIG. 10 is a block diagram illustrating an inter-shelf cabling topology 1000 according to one exemplary embodiment.

FIG. 10 illustrates a control shelf 1002 including two system managers 1012 and 1014 interconnected to shelf controllers 1008 and 1010, and five data shelf 1016, 1018, 1020, 1022, and 1024. According to an exemplary embodiment, each data shelf includes two shelf controllers, one of which may be configured as a backup controller. Specifically, as illustrated in FIG. 10, the data shelves 1016, 1018, 1020, 1022, and 1024 include shelf controllers 1026 and 1028, 1030 and 1032, 1034 and 1036, 1038 and 1040, 1042 and 1044, respectively.

Each shelf controller contains a multi-layer Ethernet switch that provides a management communications infrastructure within the shelf. Further, each shelf controller provides a single star bus interface with two external connections to allow each of the redundant system managers to connect to each shelf controller. In the control shelf 1002, the path to the shelf controllers 1008 and 1010 may be configured via the control plane interface on the backplane.

In the multi-chassis configuration, all inter-shelf connectivity is made through the system managers 1012 and 1014, physically located in the control shelf 1002, to the shelf controllers 1026–1044 within the data shelves 1016–1024. The shelf controllers establish physical connections to the application cards within their shelves. One such exemplary embodiment is illustrated in FIG. 10 in reference with the control shelf 1002, in which the shelf controllers 1008 and 1010 are interconnected to a number of application modules illustrated with application modules 1004 and 1006.

Each shelf controller illustrated in FIG. 10 contains a multi-layer (L2/L3) switch, such as a IEEE 802.1p/Q capable switch that contains twenty-four $^{10}/_{100}$ ports and two-Gigabit Ethernet ports. In one embodiment, each shelf controller may include the Broadcom BCM 5600 series Strata Switch; however, different switches could also be used. As explained in reference to earlier Figures, each shelf controller has a physically separate management bus, i.e., a system control bus, to each slot within the shelf. Further, two shelf controllers within a shelf are connected to each other with dual $^{10}/_{100}$ Mbps links.

The inter-shelf communication architecture illustrated in FIG. 10 is used for network management and carrier signaling purposes. It should be understood that switch egress modules (not illustrated in FIG. 10) also provide two external gigabit links that can also be used in the wireless system for connecting multiple chassis. Further, according to exemplary embodiments illustrated in FIG. 10 and preceding Figures, the control shelf functions reside in a single designated shelf to achieve management and operation consistency. However, it should be understood that the control shelf functionality may be distributed over a number of shelves.

According to an exemplary embodiment, the PCF on the radio node 206 illustrated in FIG. 2 may route a new communication session to any PDSN of the access node 208. The system managers are arranged in a mated pair, where one system manager card serves as a backup for the other. In such an embodiment, when a primary system manager receives load information from a PDSN, it may pass the load information to its backup partner. Thus, in case of software or hardware failure of the primary system manager, the backup system manager may detect the failure and take over the functionality of the primary system manager.

The system managers maintain statistics and status information related to all cards in each chassis in the access node 208. Further, each system manager may be programmed with PDSN IP addresses that the system manager will service, and each PDSN IP address may map to a predetermined set of characteristics of the corresponding PDSN. For instance, the system managers may group sets of PDSNs based on session types, session bit rates, or a number of sessions that each PDSN in the group can handle. Further, during a normal operation of the access node 208, the system managers may build dynamic databases for each PDSN, HA, and each mobile terminal being served on the access node. While the exemplary embodiment discloses PDSNs and HAs configured in standalone blades, the communication methods disclosed subsequently are equally applicable to configurations where the PDSN and/or HA functionality are provided by one or more blades in a communications chassis where, for example, PDSN functionality is provided in separate elements for the interface function, the call processing function and the data forwarding function.

In one embodiment, a PDSN profile or a HA profile may define a PDSN or a HA for which the profile was created using a PDSN IP address or a HA IP address, respectively. Further, each profile may define session types, session bit rates, or a number of sessions that the respective PDSN or HA is configured to handle. Additionally, each PDSN and HA profile may include a status and a state of the respective PDSN and HA, and load information for that PDSN and HA. For instance, among other parameters, the status may define whether a PDSN or HA is active or inactive, and the state may define whether the PDSN or the HA is a primary PDSN/HA or a backup PDSN/HA. In addition to the state information for each PDSN or HA, the profile may also define an IP address of its partner PDSN or HA.

Further, according to an exemplary embodiment, each PDSN and HA may be configured to periodically send their call related information to the standby PDSN and HA respectively. For instance, a PDSN profile may define whether an IPsec has been negotiated for a particular session, or a type of PPP compression being used for the session. However, it should be understood that different criteria for defining types of sessions could also be used. In such an embodiment, a system operator may download load configurations for different PDSNs in the access node 208, thus, providing better service and connectivity for users with special session types.

Figure 11:
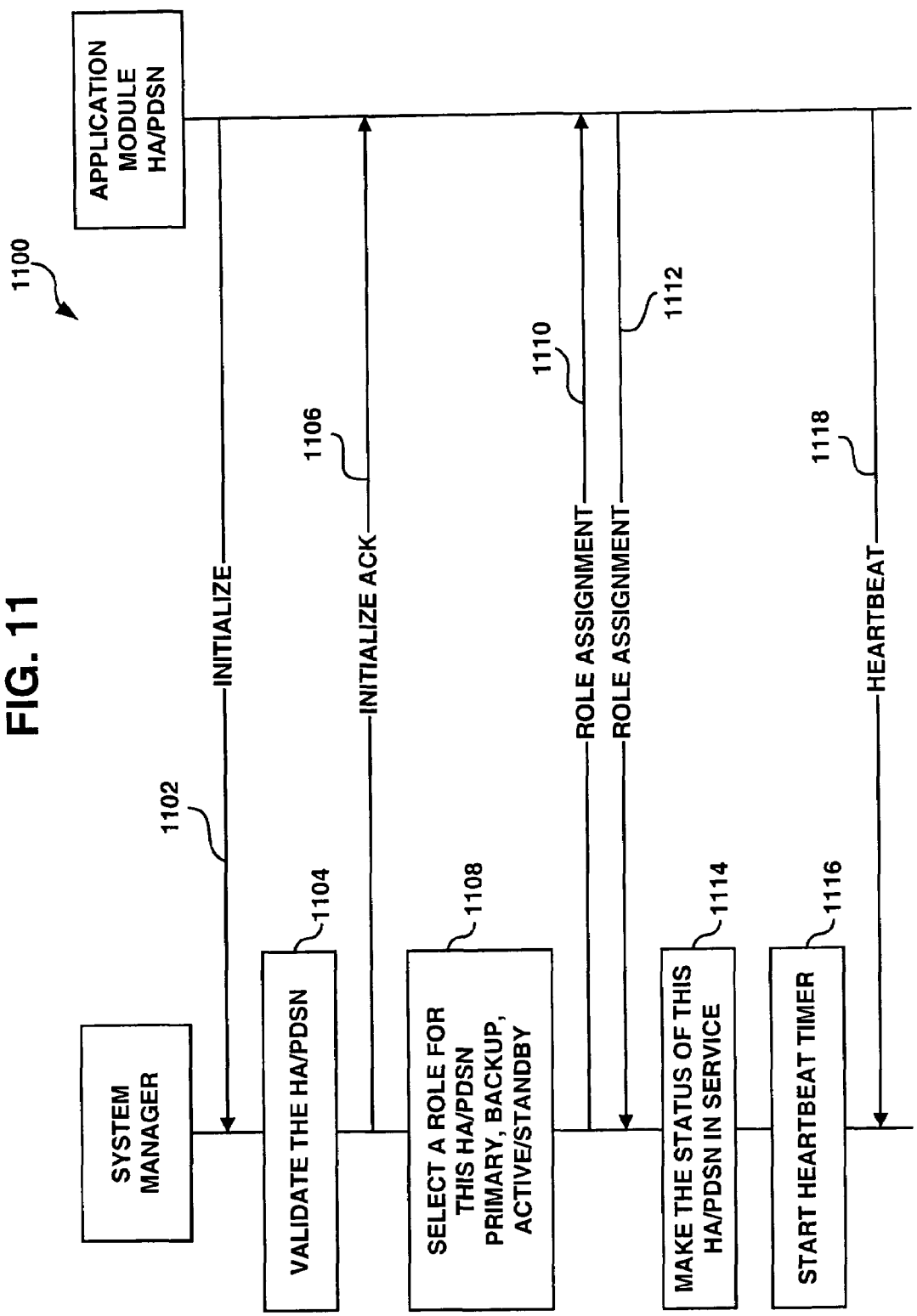
FIG. 11 is a block diagram of a message sequence scenario illustrating a PDSN/HA boot up process according to one embodiment of the present invention.

According to an exemplary embodiment, the PDSNs and HAs in the access node 208 may use a heartbeat mechanism to convey their availability and load information to the system manager. FIG. 11 illustrates an exemplary boot up process for an application module such as a HA or a PDSN. FIG. 11 simplifies the boot up process for a PDSN and a HA by illustrating a PDSN and a HA in a single PDSN/HA block; however, it should be understood that the HA and the PDSN are located on different application modules in the access node 208 according to an exemplary embodiment.

At step 1102, an application module, such as a PDSN or a HA, powers up and starts communicating with the primary system manager by sending an Initialize message to the system manager. At step 1104, the system manager validates the HA or PDSN. To do that, the system manager may read the HA or PDSN from its physical HA or PDSN list. Upon a successful validation, at step 1106, the system manager sends an Initialize Acknowledge message to the HA/PDSN.

At step 1108, the system manager selects a role for this HA/PDSN. In one embodiment, the role assignment may be dynamic. Alternatively, the system manager may be preprogrammed with role assignment files defining a role for each card such as a PDSN or a HA in the access node so that a redundancy mechanism is established. For instance, the HA/PDSN may be configured as a primary HA/PDSN having a predetermined HA/PDSN acting as its backup. Further, the HA/PDSN may assign an active role to the HA/PDSN. Alternatively, if the HA/PDSN is assigned as a backup for another HA/PDSN, the system manager may further assign a standby role to the HA/PDSN to act as a redundant HA/PDSN for a predetermined primary HA/PDSN. Different redundancy mechanisms will be described in greater detail below.

At step 1110, the system manager sends a role assignment message to the HA/PDSN, and the HA/PDSN responds by sending a role assignment acknowledge message 1112 to the system manager. At step 1114, the system manager marks the HA/PDSN as being in service, and, at step 1116, the system manager starts a heartbeat timer. In one embodiment, the heartbeat timer may identify a time period within which a next heartbeat message should be received from the PDSN/HA so that the system manager may determine that the PDSN/HA is unavailable if the next heartbeat is not received before the time period expires. Alternatively, the system manager may determine that a module is unavailable if two or more heartbeats are not received from that module. Similarly, if no heartbeat is received from the system manager, the HA/PDSN may detect the failure of the primary system manager and may send subsequent heartbeats to a redundant system manager that now acts as a primary system manager.

According to an exemplary embodiment, all PDSNs and HAs in the access node 208 periodically send their heartbeat information 1118 to the system manager so that the system manager has a rack-wide view of the status of all PDSNs and HAs. Further, alternatively, the PDSN/HA modules may receive call information from other PDSNs/HAs using IP multicasting, where each participating PDSN/HA is part of a multicasting group and supports a distributed information database.

According to an exemplary embodiment, a PDSN/HA may communicate with the system managers via the management bus (i.e., the system control bus). Alternatively, the control messages could also be exchanged via the media data bus (i.e., the switch fabric).

Figure 12:
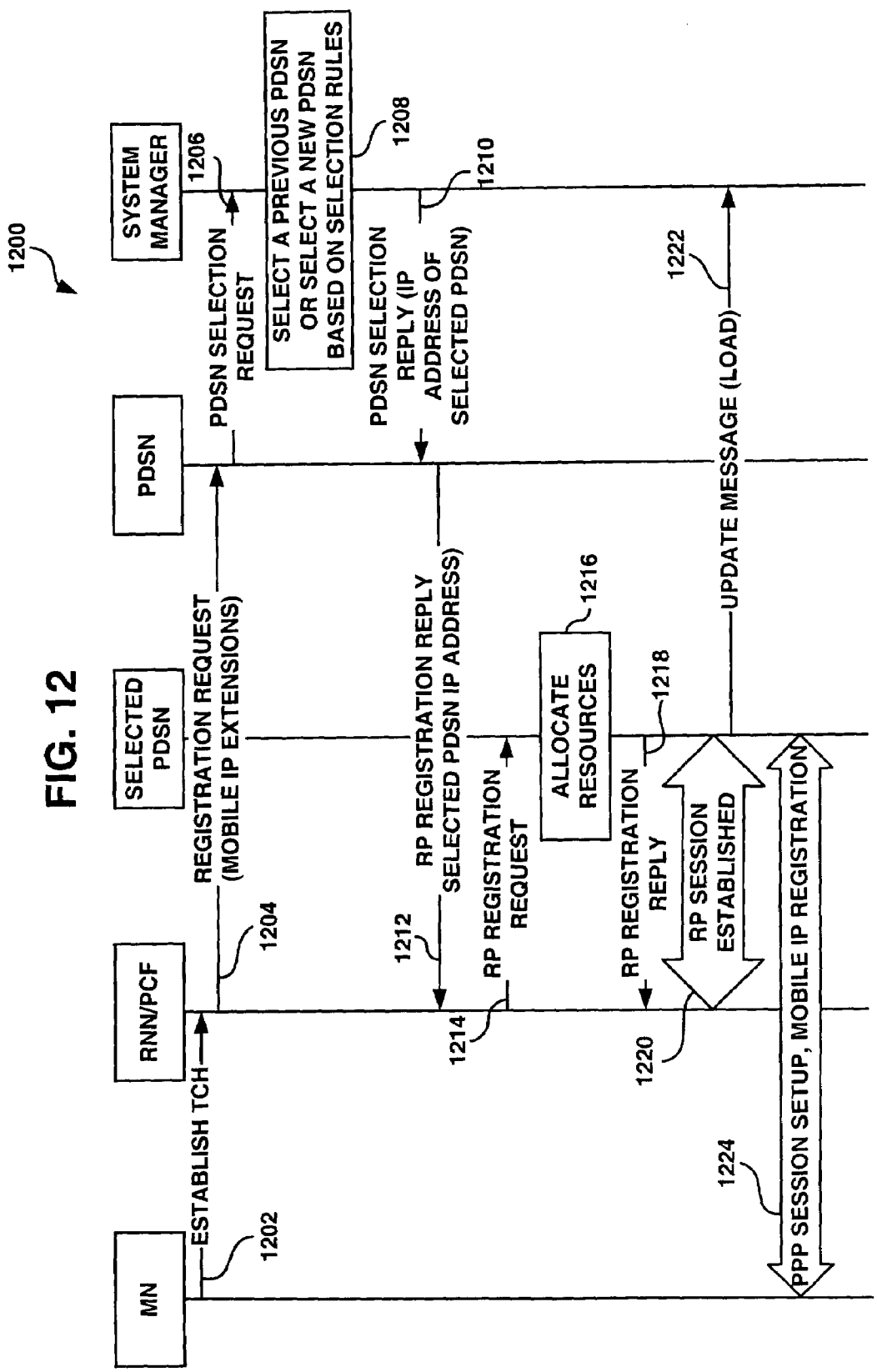
FIG. 12 is a block diagram of a message sequence scenario illustrating a PDSN selection method using a system manager according to one embodiment of the present invention.

FIG. 12 is a block diagram of a message sequence scenario 1200 illustrating a PDSN selection method using a system manager. The block diagram includes a mobile node (MN), Radio Network Node (RNN), a selected PDSN, a PDSN, and a system manager. It should be understood that the illustrated PDSNs and system manager are part of the access node 208 described in greater detail in reference to the preceding figures. When the mobile node roams into a service area of the radio network node, the mobile node initiates a traffic channel ("TCH") setup with the radio network node, as illustrated at step 1202. Upon establishing of the traffic channel, a packet control function (PCF) on the radio network node sends a registration request message 1204 to the PDSN. In one embodiment, the PCF may be configured with a set of PDSNs on the access node 208, and the PCF may select the PDSN based on its internal selection mechanism such as a load balancing mechanism or a round robin mechanism, for instance.

In the embodiment illustrated in FIG. 12, when the PDSN receives the registration request message 1204, the PDSN is unable to serve the session. The unavailability of the PDSN to serve the new session may include many reasons. The PDSN may decline to serve the session because it is overloaded. For instance, the PDSN may be configured with a threshold level identifying a number of sessions that the PDSN may serve before rejecting new sessions. Alternatively, the PDSN may be configured to monitor its capacity, and when a predetermined percentage of capacity is used, the PDSN may refuse to service a new session. Further, the PDSN may decline to service a new session due to its functional configuration. For instance, the PDSN may be configured to serve only a predetermined type of sessions, such as sessions using compression or encryption.

In the embodiment illustrated in FIG. 12, the system manager determines an alternative PDSN. Thus, the PDSN sends a PDSN selection request message 1206 to the system manager, and, at step 1208, the system manager selects a new PDSN based on a set of selection rules. The selection rules may include prior records selection rules and type of service rules. In one embodiment, the system manager may be configured to use one set of rules or a combination of different selection rules. For instance, the system manager may use one selection rule to determine a subset of PDSNs that may service the incoming session and then may use another rule to select one PDSN that may service the incoming session.

As mentioned in the preceding paragraphs, the system manager may apply prior records selection rules to determine a new PDSN. In such an embodiment, the system manager uses the prior registration records of the mobile user to determine and select the PDSN that served the previous session on the mobile node. In one embodiment, each PDSN may be configured to send registration records for a mobile node upon a successful call setup.

Upon selecting a PDSN, the system manager sends to the PDSN a PDSN selection reply message 1210 including an IP address of the selected PDSN. When the PDSN receives the message 1210, the PDSN sends to the radio network node an RP registration reply message 1212 including the IP address of the selected PDSN. The RP registration reply message 1212 may take a form of a message "Error 136," described in the RFC 2002. However, different types of messages could also be used.

Next, the radio network node sends an RP registration request message 1214 to the selected PDSN, and the selected PDSN allocates resources to serve the incoming session, as illustrated at step 1216. It should be understood that the selected PDSN may reject to serve the incoming session, and the process of querying the system manager may be repeated. In such an embodiment, the system manager may determine that a PDSN selection request has been sent from the selected PDSN, and the system manager may reply with a PDSN selection reply included the IP address of the PDSN that sent the request. Additionally, the PDSN selection reply message may include an identifier, such as a predetermined bit or a bit pattern, notifying the PDSN that it should serve the session. Further, it should be understood that a predetermined bit or a bit pattern may be set in the PDSN selection reply message indicating a number of PDSNs that have rejected processing the request. In such an embodiment, the PDSN may be configured to accept the request when the predetermined number of PDSNs rejected to service the session. It should be understood that different embodiments preventing service delays or a large number of PDSNs rejecting new sessions could also be used.

Upon allocating resources, the selected PDSN sends an RP registration reply message 1218, and the RP session is established between the radio network node and the selected PDSN, as illustrated at 1220. Further, according to an exemplary embodiment, upon the allocation of resources to the new session, the selected PDSN sends to the system manager an update message 1222 including a new load on the selected PDSN. The update message 1222 may include session information for the established call session including the NAI or IMSI of the mobile node. Alternatively, the selected PDSN may send to the system manager a separate message including the session information. As mentioned in reference to the preceding paragraphs, the system manager may use the session information to determine the last serving PDSN when the mobile node registers next time. At step 1224, the mobile node establishes a point-to-point protocol ("PPP") session to the selected PDSN and registers with the selected PDSN.

Figure 13:
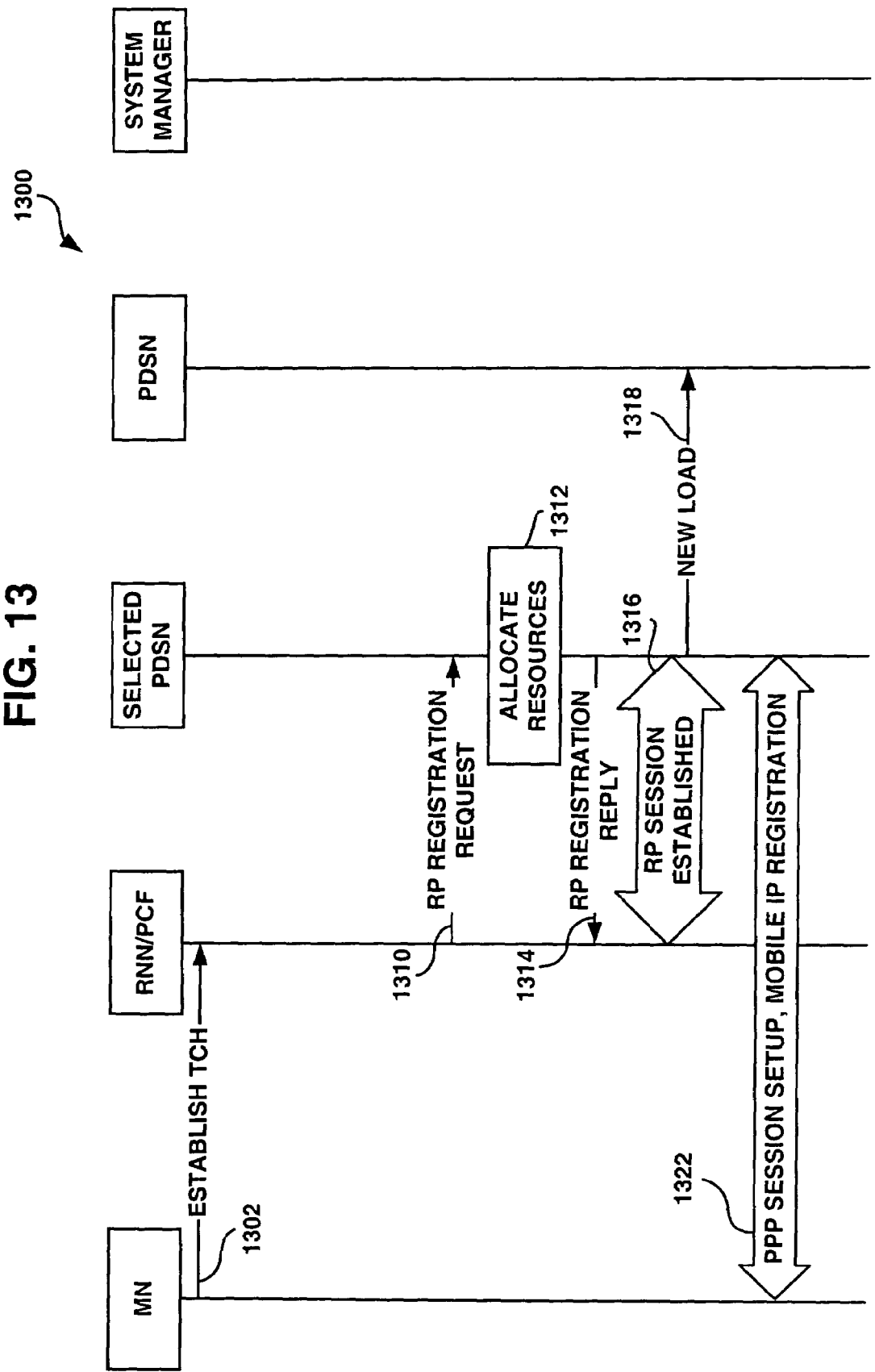
FIG. 13 is a block diagram of a message sequence scenario illustrating a PDSN selection method using a distributed information database mechanism according to one embodiment of the present invention.

FIG. 13 is a block diagram of a message sequence scenario 1300 illustrating a PDSN selection according to a distributed control node method. In the distributed control node mechanism, each PDSN card in the access node may periodically request a system manager to provide load information of all PDSNs in the access node 208. Alternatively, the PDSN may receive load information from all PDSNs in the access node 208. In such an embodiment, each PDSN may provide load information to other PDSNs using IP multicasting methods, or any other currently existing or later developed transmission methods. FIG. 13 illustrates a mobile node, a radio network node with a packet control function, a selected PDSN, a PDSN, and a system manager.

When the mobile node roams into the serving area of the radio network node, the mobile node sends to the radio network node a message 1302 including a request to establish a traffic channel with the radio network node. When the channel is established, the radio network node sends an RP registration request message 1304 to the PDSN. In an embodiment, in which the packet control function keeps a plurality of PDSN IP addresses in its PDSN table, the packet control function may apply a load balancing mechanism to determine the IP address of the PDSN. Alternatively, the packet control function may keep only two entries in its table including an IP address of a primary PDSN and an IP address of a secondary PDSN. In such an embodiment, the PCF may send all new call session requests to the primary PDSN until the primary PDSN is unavailable to serve the incoming session. When the primary PDSN fails or becomes overloaded, the PCF may send new call sessions to the IP address of the secondary PDSN.

According to an embodiment illustrated in FIG. 13, the PDSN determines that it is unable to service the incoming registration request, or at least that PDSN is above a predetermined threshold level such that another PDSN should preferably handle the call. The PDSN may make that determination based on a number of factors discussed in reference to FIG. 12.

When the radio network node selects and sends an RP registration request message 1310 to the IP address of a selected PDSN, and the selected PDSN allocates resources for the new session, as shown at 1312. Next, the selected PDSN sends an RP registration reply message 1314, and an RP session 1316 is established between the radio network node and the selected PDSN. Further, according to an exemplary embodiment, the selected PDSN sends its updated load information to the original PDSN, as shown at 1318. FIG. 13 illustrates only one PDSN receiving the load information from the selected PDSN; however, it should be understood that the selected PDSN may also send its load to other PDSNs in its multicast group. Further, the selected PDSN may send to the standby PDSN its new call information as will be described in greater detail subsequently. It should be understood that the system manager could be a part of the multicast group as well. Alternatively, the selected PDSN may send its new load to the system manager in a heartbeat message.

Upon successful registration with the selected PDSN, a PPP session is established between the mobile node and the selected PDSN, and the mobile registers with the selected PDSN, as shown at 1322.

According to one exemplary embodiment, in addition to PDSNs, the access node may also include HAs that are also managed by the system manager. As mentioned in reference to FIG. 11, all HA in the access node heartbeat with the system manager and periodically send their load information to the system manager. Similarly to the embodiments described in reference to PDSNs, the system manager may keep a control node database including loads for each HA in the access node. Alternatively, the control node database may be distributed across all HA, where each participating HA may keep load information of all other participating HAs. In such an embodiment, each participating HA may update its load on other HAs using IP multicasting, and all participating HAs and the system manager may be a part of a multicasting group to support the distributed control node information database.

Figure 14:
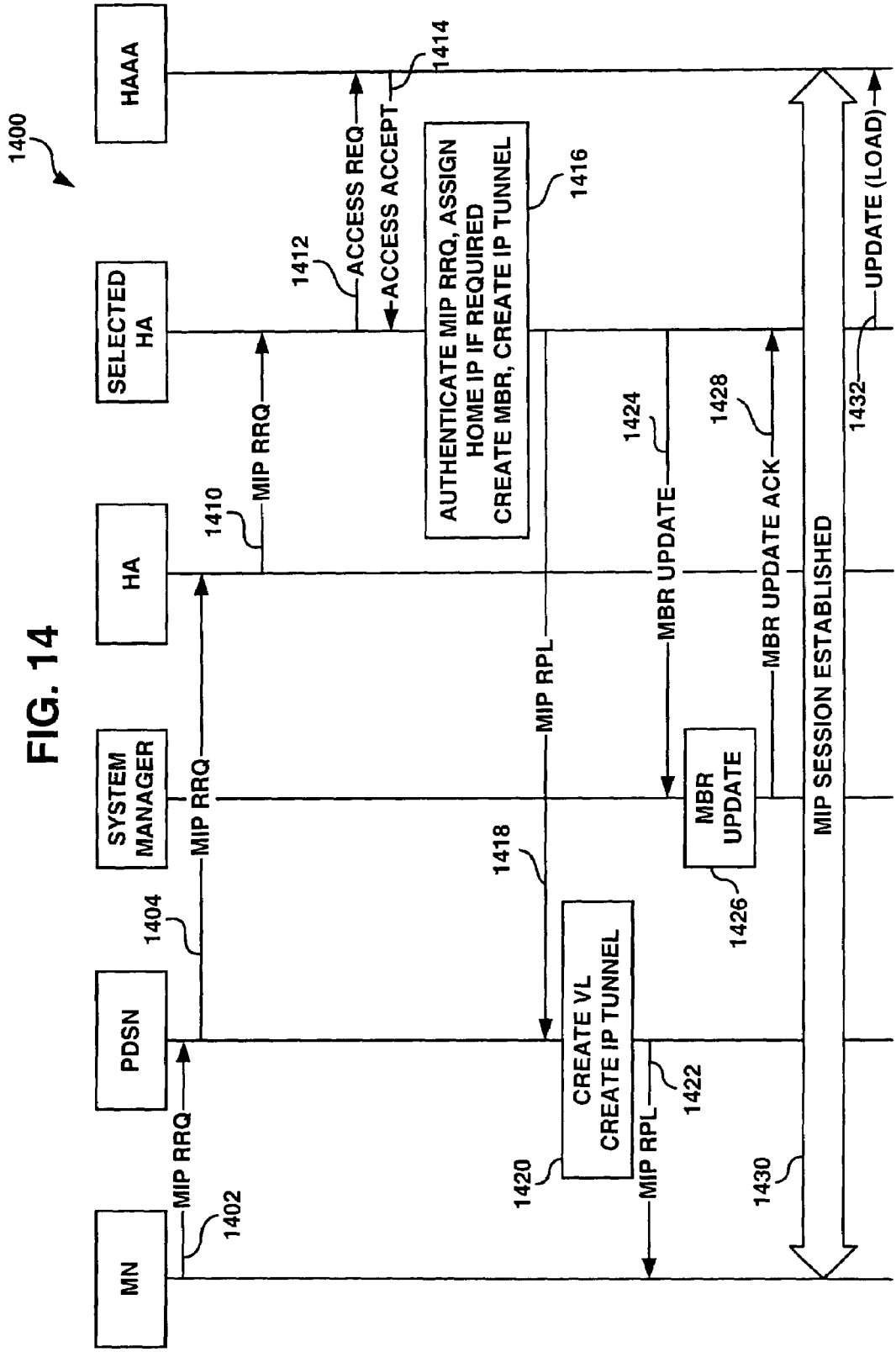
FIG. 14 is a block diagram of a message sequence scenario illustrating a HA registration process using a system manager according to one embodiment of the present invention.

FIG. 14 is a block diagram of a message sequence scenario 1400 illustrating a HA registration process in an embodiment, in which the system manager selects a new HA when an originating HA is unavailable. FIG. 14 illustrates a mobile node, a PDSN, a system manager, a HA, a selected HA, and a HAAA.

When the mobile node establishes a PPP session with the PDSN using one of the methods described in reference to FIGS. 12 and 13, the mobile node sends a MIP registration request message 1402 to the PDSN. In one embodiment, the registration request message 1402 may specify an IP address of a HA requested by the mobile node. Alternatively, the PDSN may contact a FAAA server to determine an IP address of a HA for the mobile node. The PDSN then forwards the registration request message to the HA, as illustrated at 1404. According to the embodiment illustrated in FIG. 14, the HA determines that it is unable to handle the call session due to the overload or near overload conditions, or because a static mobile node IP address proposed by the mobile node does not belong to the current HA's IP address pool, for instance. The HA communicates with the standby HA with respect to a load map. It should be understood that a different message scheme could also be used to obtain an IP address of the alternative home agent.

The HA receives from the standby HA load information for other HA's in the redundancy group. The active HAs receive a periodic message with a load map from the backup HA. This load map contains the load on the four least loaded HAs and the average load in each HA in the redundancy group. The active HA uses this load information to decide if an alternative HA needs to be selected. If the load on the active HA is greater than the average load by a certain persentage, then the active HA selects the least loaded among four HAs from the load map. The Mobile IP Registration request is then forwarded 1410 to the alternative HA for processing.

At step 1416, the selected HA authenticates the MIP registration request message and creates an MBR for the mobile node. Further, the selected HA starts negotiating and setting up an IP tunnel to the PDSN. Next, the selected HA sends a MIP registration reply message 1418 to the PDSN, and the home agent field in the MIP registration reply message 1418 includes the IP address of the selected HA. At step 1420, the PDSN creates the IP tunnel to the selected HA and a visitor list (VL) for the mobile node. The PDSN may create a VL for each mobile IP call, and each VL may include an IP address of the serving HA, an IP address of the mobile node, tunneling parameters, and authentication information.

At step 1422, the PDSN forwards the MIP reply message to the mobile node. At step 1424, the selected HA also sends an Mobility Binding Record (MBR) update message 1424 to the system manager that then responds with an MBR update ACK message 1428 upon updating the MBR, as shown at step 1426. The MIP session is established as shown at step 1430. Further, at step 1432, the selected HA sends to the system manager an update message including its current load data.

Figure 15:
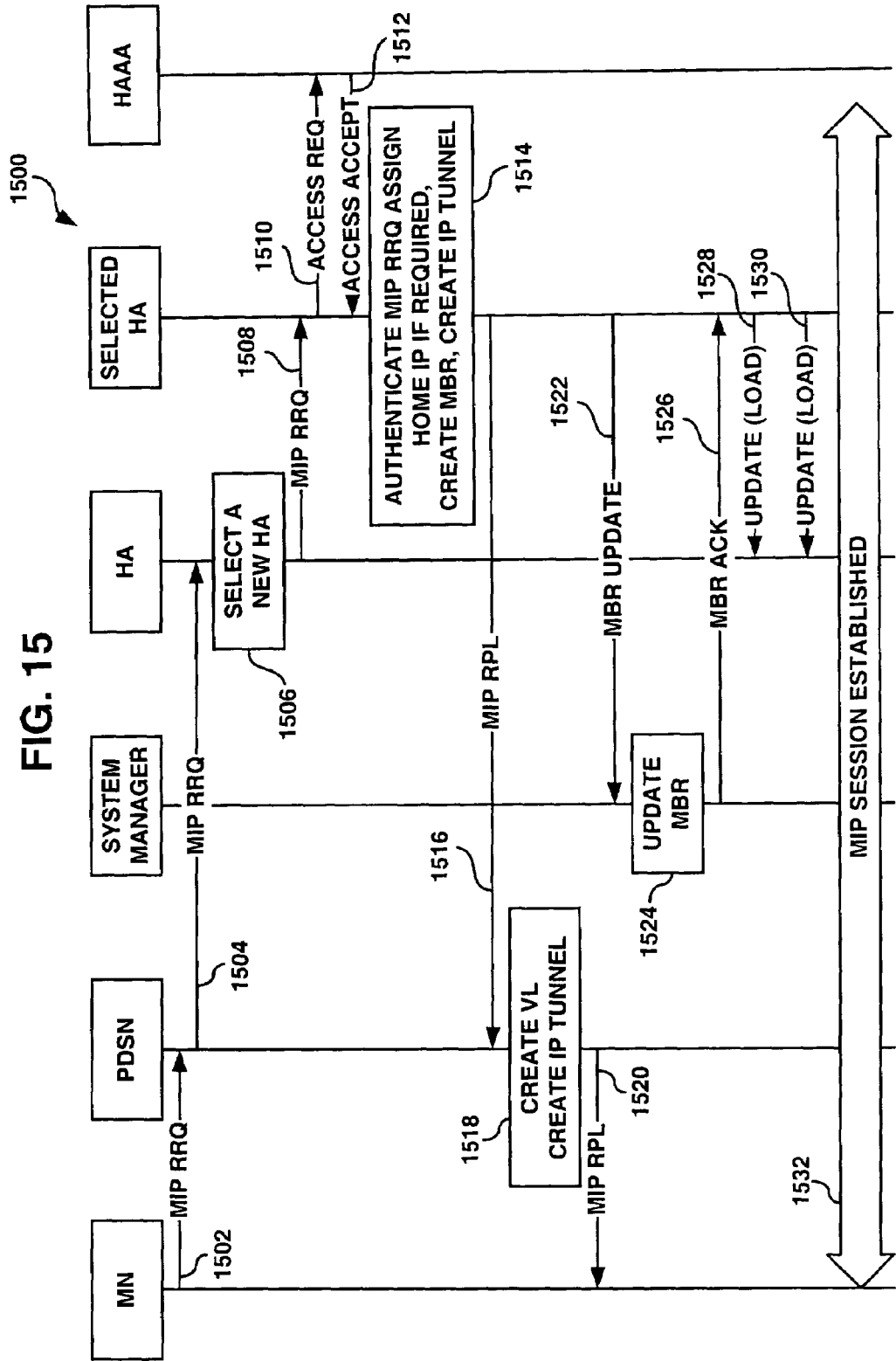
FIG. 15 is a block diagram of a message sequence scenario illustrating a HA registration process using a distributed information database mechanism according to one embodiment of the present invention.

FIG. 15 is a block diagram of a message sequence scenario illustrating a HA registration process, in which the HA participates in the distributed information database mechanism. In such an embodiment, each HA may be configured to determine a new HA if the HA is overloaded, for instance. Further, in such an embodiment, each participating HA may periodically receive from the standby HA load update information of other participating HAs. Alternatively, the HA may receive the load information via IP multicasting from each participating HA. Similarly to FIG. 14, FIG. 15 illustrates a mobile node, a PDSN, a system manager, a HA, a selected HA, and a HAAA.

Upon establishing a PPP session to the PDSN, the mobile node sends a MIP registration request message 1502 to the PDSN. In one embodiment, the MIP registration request message may include an IP address of the HA requested by the mobile node. Alternatively, the PDSN may query a FAAA to determine a HA IP address for the mobile node. Next, the PDSN forwards the registration request message to the HA, as illustrated at step 1504.

When the HA receives the MIP registration request message 1504, the HA determines that it is unable to serve the request, and selects a new HA, as illustrated at step 1506. According to an exemplary embodiment illustrated in FIG. 15, the HA participates in the distributed information database, and, thus, has load information of other HAs participating in this scheme. Thus, the selection criteria may be based on the load of each HA, where the HA selects a HA having the lowest load, a type of session, a call data rate, or a type of service associated with a user, for instance. The HA then forwards the MIP registration request to the selected HA, as illustrated at step 1508.

Further, the selected HA may send an access request message to the HAAA that responds with an access accept message 1512. At step 1514, the selected HA authenticates the MIP registration request message, creates an MBR, and sets up an IP tunnel to the PDSN. At step 1516, the selected HA sends a MIP reply message to the PDSN that responsively creates a Visitor List (VL) for the mobile node and sets up the IP tunnel to the selected HA, as illustrated at 1518. At step 1520, the PDSN forwards the MIP registration reply message to the mobile node, and a MIP session is established, as illustrated at step 1532.

At step 1522, the selected HA sends an MBR update to the system manager that, at step 1524, updates the MBR and sends a MBR ACK message 1526. Further, at step 1528, the selected HA sends an update message to the HAs participating in the distributed database mechanism, and the update message includes the current updated load of the HA. FIG. 15 illustrates only one HA receiving the update message 1528. However, it should be understood that the HA may generate an IP multicast that is received by all participating HAs. Further, the update message is also received by the standby HA. It should be understood that the HA may generate an exclusive message for the standby HA or, alternatively, the IP address of the standby HA may be included in the multicast group, as illustrated at 1530.

In addition to load balancing and otherwise selectively routing and re-routing the incoming communication sessions, the components of the control shelf and data shelf exhibit redundancy with failover capabilities. For instance, the control shelf illustrated and described in reference to FIG. 5 includes two shelf controllers 502 and 504, and two system managers 510 and 512. In such an embodiment, one of the system managers/shelf controllers may be configured as an active system manager/shelf controller, and the other one as a redundant (standby) system manager/shelf controller. Therefore, if the active unit fails, the redundant unit may detect the failure and take over the active role.

The standby system manager and shelf controller may perform heartbeat operations with their active partners to determine the non-availability of the active partner. A standby entity may send a Heartbeat Request message every time its heartbeat timer expires, and an active entity may respond with an acknowledgement message. If no acknowledgement message is received, the standby entity may assume that that the active entity is non-operational. Alternatively, based on the configuration, an active entity may resend a heartbeat, and if another response is not received, it may then assume that its partner is non-operational. Further, according to an exemplary embodiment, each member of a mated pair has a complete mirror image of its partner's data. For instance, each PDSN or HA may have two separate physical links with each system manager so that the active system manager and the backup system manager receive the same information simultaneously. Alternatively, the active system manager may receive updated load information from one or more PDSNs or HAs, and it may pass the received information to the standby system manager via the system data bus, for instance.

Further, each application module (PDSN/HA) may be arranged in a mated pair to provide 1 to 1 redundancy, and each PDSN in a pair of partners serves as a backup for the other. When a new session arrives at a PDSN, the PDSN sends all of the state information associated with the session to its partner. Similarly, session state information is also passed to the partner when the state changes. Thus, each member of a mated pair has a complete mirror image of its partner's session. According to an exemplary embodiment, the PDSNs/HAs may communicate over the switch egress modules or the internal buses. Further, the partner PDSN/HA may take over the session if the primary PDSN fails. According to one exemplary embodiment, the PDSNs/HAs may use a handoff method described in the co-pending patent application Ser. No. 10/041,436, "Smooth Handoff via State Exchange in Wireless Network," fully incorporated herein by reference.

It should be understood that a number of configuration schemes may be employed to achieve functional redundancy. For example, as mentioned above, two PDSNs/HAs may be paired and configured as primary and secondary (backup) PDSNs/HAs, and the primary PDSN/HA will handle all sessions until it is out of service. In such an embodiment, the backup PDSN/HA is a passive non-active backup that takes over the functionality of the primary PDSN/HA upon its failure. Further, the secondary or backup PDSN/HA receives a mirror image of all traffic that is received on the primary PDSN/HA over the internal media data bus, and the backup PDSN/HA does not have the ability to externally communicate data. In such an embodiment, all data exiting a backup application module on its external interfaces is dropped.

In the primary/backup configuration, the system manager monitors the activity status of all active cards in the shelf. To do that, the system manager may use a Simple Network Management Protocol ("SNMP"), fully described in the Internet Engineering Task Force ("IETF") Request For Comment ("RFC") 1157, and incorporated herein by reference. In one embodiment, the SNMP may be used to poll PDSNs/HAs that include Management Information Base ("MIBs"). Further, the system manager may use a Common Object Request Broker Architecture ("CORBA") based method to determine a status of each card. Using the SNMP, the system manager may detect the failure of the PDSN/HA if the failed PDSN/HA does not respond to SNMP polls. When the primary PDSN/HA fails, the system manager sends a message to the backup PDSN/HA, and the backup PDSN/HA acts as the primary PDSN/HA. Further, when the backup PDSN/HA takes over, it sends Address Resolution Protocol ("ARP") messages to the external routers so that the data is forwarded to the backup PDSN/HA and not the PDSN/HA that failed. Also when the primary PDSN/HA fails, the backup PDSN/HA uses the same external IP address as the primary card.

According to another exemplary embodiment for redundancy, two mated PDSNs/HAs may be active and handle communication sessions. In such an embodiment, the primary PDSN/HA sends data for only active communication sessions to the backup PDSN/HA via the media data bus, and when a session becomes dormant, the backup PDSN/HA removes the session information from its memory while the primary PDSN/HA still keeps it. In such an embodiment, memory requirement for supporting this kind of redundancy is minimized, and only active sessions are cached in the backup PDSN/HA for immediate switch-over in case of failure of the primary PDSN/HA. Further, the active card may only send control data for the active sessions to save data processing for backed up sessions. When a backup PDSN/HA takes over, the backup module (now a primary module) sends out ARP messages to external network entities and attaches the IP addresses of the failed card to its relevant network interfaces such as an R–P interface and a Pi interface, for instance.

Further, alternatively, instead of 1 to 1 redundancy, one application module (PDSN/HA) in the chassis may be assigned as a backup for all other application modules (PDSNs/HAs), thus, creating N to 1 redundancy. The N to 1 redundancy scheme may be desirable in communication systems, in which the majority of communication sessions are often dormant. Thus, for a system to be redundant and to avoid data and call loss, a backup module may be required for active sessions. In such an embodiment, the number of primary modules that may be backed up by a single backup module may be determined based on the amount of memory that is needed to back up the active session for N PDSNs/HAs.

In the N to 1 redundancy scheme, all active modules may send control and some data information that affect the state of a call to one backup module. When one or more of N PDSNs/HAs fail, the system manager may inform the backup module about the failed module, and the backup module provides network interfaces for the failed module.

To accomplish the desired N to 1 redundancy with a minimum of communication traffic and storage requirements in the standby PDSN, only non-recoverable state is transferred to the standby PDSN. Updates transferred to the standby PDSN by the N active PDSNs are divided into categories based on the type of data them apply to and how they often they are sent.

The data types for the embodiment disclosed herein are:
"Per PDSN data" which applies to the entire PDSN state and all calls. Examples of per PDSN state include care of IP address, MAC address, etc.
"Per home agent (HA) data" which contains state that is associated with a particular HA and all of the calls on that HA. Examples of per HA state include HA IP address, FA-HA SPI and key, etc., and
"Per call data" which are state that belongs to a particular call only. Examples of per call state include PPP state, mobile IP (MIP) state, etc.

The update types for the embodiments disclosed herein are:
"Static updates" which are expected to just be sent once. Static updates may be sent more than once, but the expected frequency is extremely low. Examples of a static update might be a SIP call's home IP address.
"Triggered updates" which are sent in response to receiving information from a source external to the PDSN or a state change within the PDSN. Examples of triggered updates are dormancy indications from the PCF, PPP idle timer timeout, etc.
"Dynamic updates" which send data that changes very rapidly, potentially on every packet that is sent or received by the user.

For the embodiments to be described subsequently, each of the N active PDSN cards and the standby PDSN card are assigned the active/standby role by the system manager as previously described with respect to FIG. 11. The system manager informs each active PDSN of its associated standby PDSN as a portion of the role assignment protocol.

Figure 16:
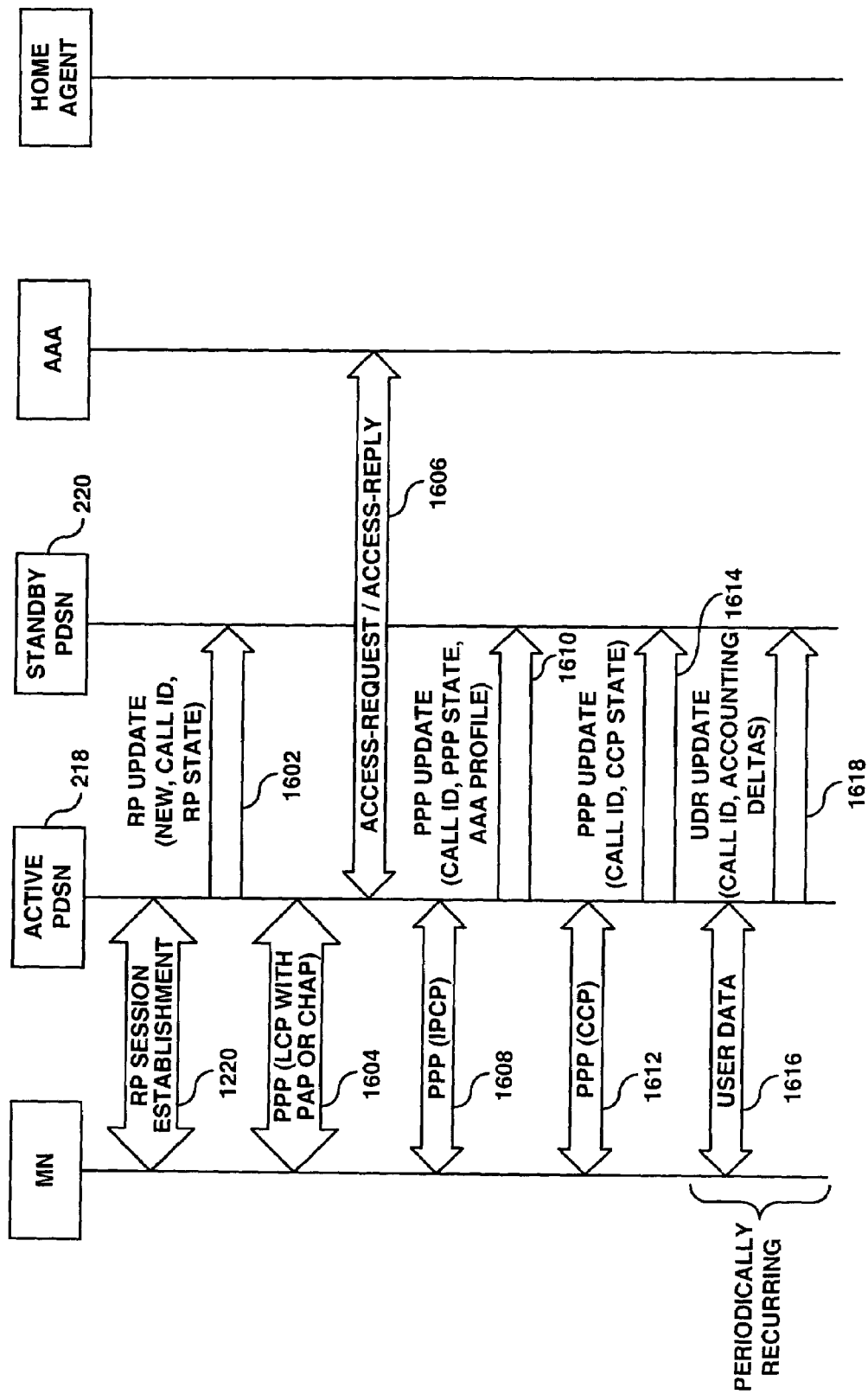
FIG. 16 is a block diagram of a message sequence scenario illustrating standby PDSN updating for a simple IP call.

An exemplary embodiment of a system employing the N to 1 redundancy of PDSNs is reflected in FIG. 16 for a simple IP call. For the embodiment in the drawings, one active PDSN 218 is shown and one standby PDSN 220 with the understanding that communication of the one active PDSN shown and described herein is duplicated for each of the N active PDSNs. Communication between the active and standby PDSN is conducted in the embodiment shown using the system control bus as previously described with respect to FIG. 8. Selection of a PDSN and establishment of an RP session is accomplished as described with respect to FIG. 12. Upon establishment of the session, the active PDSN provides an RP Update 1602 to the standby PDSN. The RP Update includes data for the new call ID and the RP state. Each call is identified with a call identifier that is unique to the active PDSN. Data transmitted for the RP state is shown in Table 1.

TABLE 1

RP state

| State | Size |
| --- | --- |
| PCF IP address (CoA) | 4 bytes |
| Forward direction GRE key | 4 bytes |
| Reverse direction GRE key | 4 bytes |
| Forward direction GRE sequence number | 4 bytes |
| Reverse direction GRE sequence number | 4 bytes |
| Lifetime begin timestamp | 4 bytes |
| Lifetime | 2 bytes |
| Flags | 1 byte |
| Home agent IP address | 4 bytes |
| Identification | 8 bytes |
| GRE protocol type | 2 bytes |
| Session reference ID | 2 bytes |
| MSID (IMSI) | Varies |

As previously discussed with respect to FIG. 12, the mobile node establishes a PPP session to the selected PDSN and registers with the selected PDSN as shown in step 1604 including Link Control Protocol ("LCP") using Password Authentication Protocol ("PAP") or Challenge Handshake Authentication Protocol ("CHAP"). Access request and access reply communication 1606 is conducted between the active PDSN and the HAAA 216 or FAAA 214 as previously described with respect to FIG. 2.

Once IP Control Protocol has been negotiated in the PPP session at step 1608, the active PDSN updates the standby PDSN with the call ID, the PPP state and the AAA profile in step 1610. The PPP state is defined per call and includes the LCP data as defined in Table 2, the PAP/CHAP data defined in Table 3 and the IPCP data shown in Table 4. Since no PAP or CHAP state exists per se, the data required, as shown in Table 3 is limited to a record of the protocol used and the authentication of the user.

TABLE 2

LCP state

| State | Size |
| --- | --- |
| Address/control field compression | 1 bit |
| Protocol field compression | 1 bit |
| Maximum receive unit (MRU) | 4 bytes |
| Authentication protocol | 2 bytes |
| Link quality protocol | 2 bytes |
| Magic number | 4 bytes |

TABLE 3

PAP/CHAP state

| State | Size |
| --- | --- |
| Authentication successful | 1 bit |
| Authentication used (PAP, CHAP, noauth) | 2 bits |

TABLE 4

IPCP state

| State | Size |
| --- | --- |
| IP compression protocol | 2 bytes |
| IP address | 4 bytes |
| PDSN IP address | 4 bytes |

TABLE 4-continued

IPCP state

| State | Size |
| --- | --- |
| Primary DNS address | 4 bytes |
| Secondary DNS address | 4 bytes |

The AAA profile will constitute the group of RADIUS parameters that are returned from the HAAA in the access-reply which may include, but is not limited to, the parameters shown in Table 5.

TABLE 5

AAA User Profile Data

| State | Size |
| --- | --- |
| User name | Varies |
| Correlation ID | 4 bytes |
| Always on | 4 bytes |
| Home agent IP address | 4 bytes |
| Framed IP address | 4 bytes |
| Security level | 4 bytes |
| Pre-shared secret | Varies |
| Reverse tunnel specification | 4 bytes |
| KeyID | 4 bytes |
| Diffserv markng | 4 bytes |
| Service option profile | 4 bytes |
| MN-AAA removal indication | 4 bytes |
| PPP idle time | 4 bytes |
| PPP idle time begin timestamp | 4 bytes |
| PPP session time | 4 bytes |
| PPP session time begin timestamp | 4 bytes |
| PPP accounting interval | 4 bytes |

If Compression Control Protocol ("CCP") is negotiated between the mobile node and active PDSN, as shown in step 1612, a separate PPP update 1614 will be made to the standby PDSN to provide the CCP state as shown in Table 6.

TABLE 6

CCP state.

| State | Size |
| --- | --- |
| Compression algorithm | 1 byte |

When user data begins transmission as shown in step 1616, Usage Data Record ("UDR") information for accounting purposes is periodically synchronized with the standby PDSN, as shown in step 1618. Exemplary UDR data is shown in Table 7.

TABLE 7

UDR data

| State | Size |
| --- | --- |
| A1: MSID | Varies |
| A2: ESN | Varies |
| B1: MS IP address | 4 bytes |
| B2: NAI | Varies |
| C1: Account session ID | 4 bytes |
| C2: Correlation ID | 4 bytes |
| C3: Session continue | 4 bytes |
| C4: New session | 4 bytes |
| D1: HA IP address | 4 bytes |

TABLE 7-continued

UDR data

| State | Size |
|---|---|
| D2: PDSN IP address | 4 bytes |
| D3: Serving PCF | 4 bytes |
| D4: BSID | Varies |
| E1: User Zone | Varies |
| F1: Forward MUX | 4 bytes |
| F2: Reverse MUX | 4 bytes |
| F5: Service option | 4 bytes |
| F6: Forward traffic type | 4 bytes |
| F7: Reverse traffic type | 4 bytes |
| F8: Fundamental frame size | 4 bytes |
| F9: Forward fundamental RC | 4 bytes |
| F10: Reverse fundamental RC | 4 bytes |
| F11: IP technology | 4 bytes |
| F12: Compulsory tunnel indicator | 4 bytes |
| F13: Release indicator | 4 bytes |
| F14: DCCH frame size | 4 bytes |
| F15: Always on | 4 bytes |
| G1: Forward data octet count | 4 bytes |
| G2: Reverse data octet count | 4 bytes |
| G3: Bad PPP frame count | 4 bytes |
| G4: Event time | 4 bytes |
| G8: Active time | 4 bytes |
| G9: Active transitions | 4 bytes |
| G10: Forward SDB octet count | 4 bytes |
| G11: Reverse SDB octet count | 4 bytes |
| G12: Number of forward SDBs | 4 bytes |
| G13: Number of reverse SDBs | 4 bytes |
| G14: HDLC bytes received | 4 bytes |
| G15: Forward MIP octet count | 4 bytes |
| G16: Reverse MIP octet count | 4 bytes |
| I4: Airlink priority | 4 bytes |
| Y1: Airlink record type | 4 bytes |
| Y2: R-P connection ID | 4 bytes |
| Y3: Airlink sequence number | 4 bytes |
| Y4: SDB direction | 4 bytes |

Figure 17:
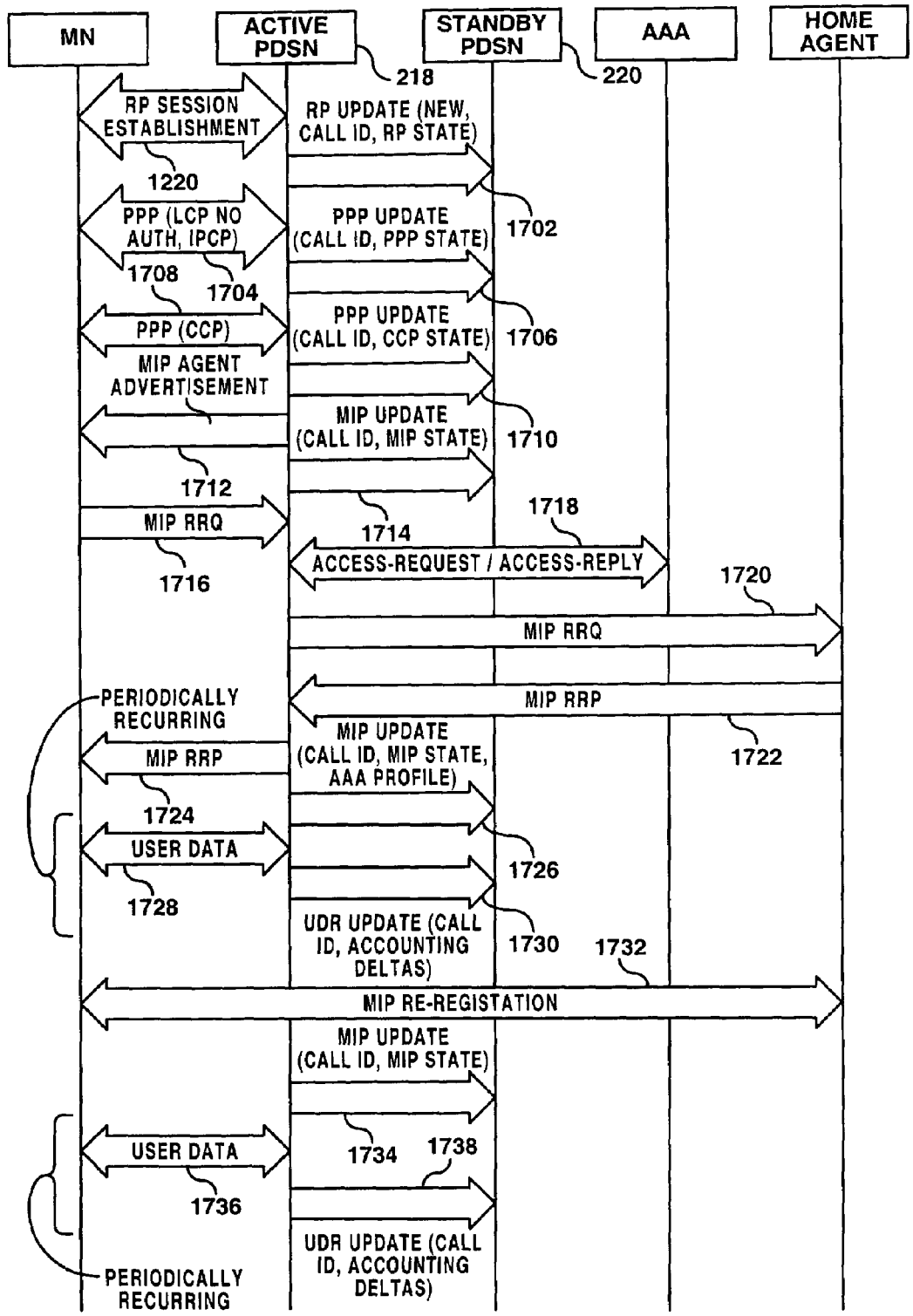
FIG. 17 is a block diagram of a message sequence scenario illustrating standby PDSN updating for a mobile IP call.

FIG. 17 demonstrates the data update structure for the N to 1 PDSN redundancy for a Mobile IP application. As previously described for the simple IP case in FIG. 16, after the RP Session has been established 1220, the call ID and RP state as defined in Table 1 are sent to the standby PDSN in step 1702. Unlike the simple IP case, in the mobile IP application, the PPP negotiates with the LCP, skips the authentication and then completes the IPCP as shown in step 1704. The active PDSN then updates the standby PDSN with the call ID and PPP state in step 1706. The PPP then establishes the CCP for the call in step 1708 and the standby PDSN is updated 1710 with the CCP state as shown in Table 6. The active PDSN sends an agent advertisement to the mobile node in step 1712 and the MIP state is then updated on the standby PDSN in step 1714. The MIP state is shown in Tables 8 and 9 for data per mobile call and per home agent respectively.

TABLE 8

Per call mobile IP/MPA state

| State | Size |
|---|---|
| Care of address | 4 bytes |
| Forward direction GRE key | 4 bytes |
| Reverse direction GRE key | 4 bytes |
| Forward direction GRE sequence number | 4 bytes |
| Reverse direction GRE sequence number | 4 bytes |
| Lifetime begin timestamp | 4 bytes |
| Lifetime | 2 bytes |
| Flags | 1 byte |
| Home agent IP address | 4 bytes |

TABLE 8-continued

Per call mobile IP/MPA state

| State | Size |
|---|---|
| Identification | 8 bytes |
| Home IP address | 4 bytes |
| GRE protocol type | 2 bytes |
| Agent advertisement sequence number | 2 bytes |
| Agent advertisement flags | 1 byte |
| FA challenge | Varies |
| Home address | 4 bytes |
| Revocable registration | 1 bit |
| Revocation flags | 2 bits |

TABLE 9

Per home agent mobile IP state

| State | Size |
|---|---|
| FA-HA SPI | 4 bytes |
| FA-HA key | Varies |

Figure 1:
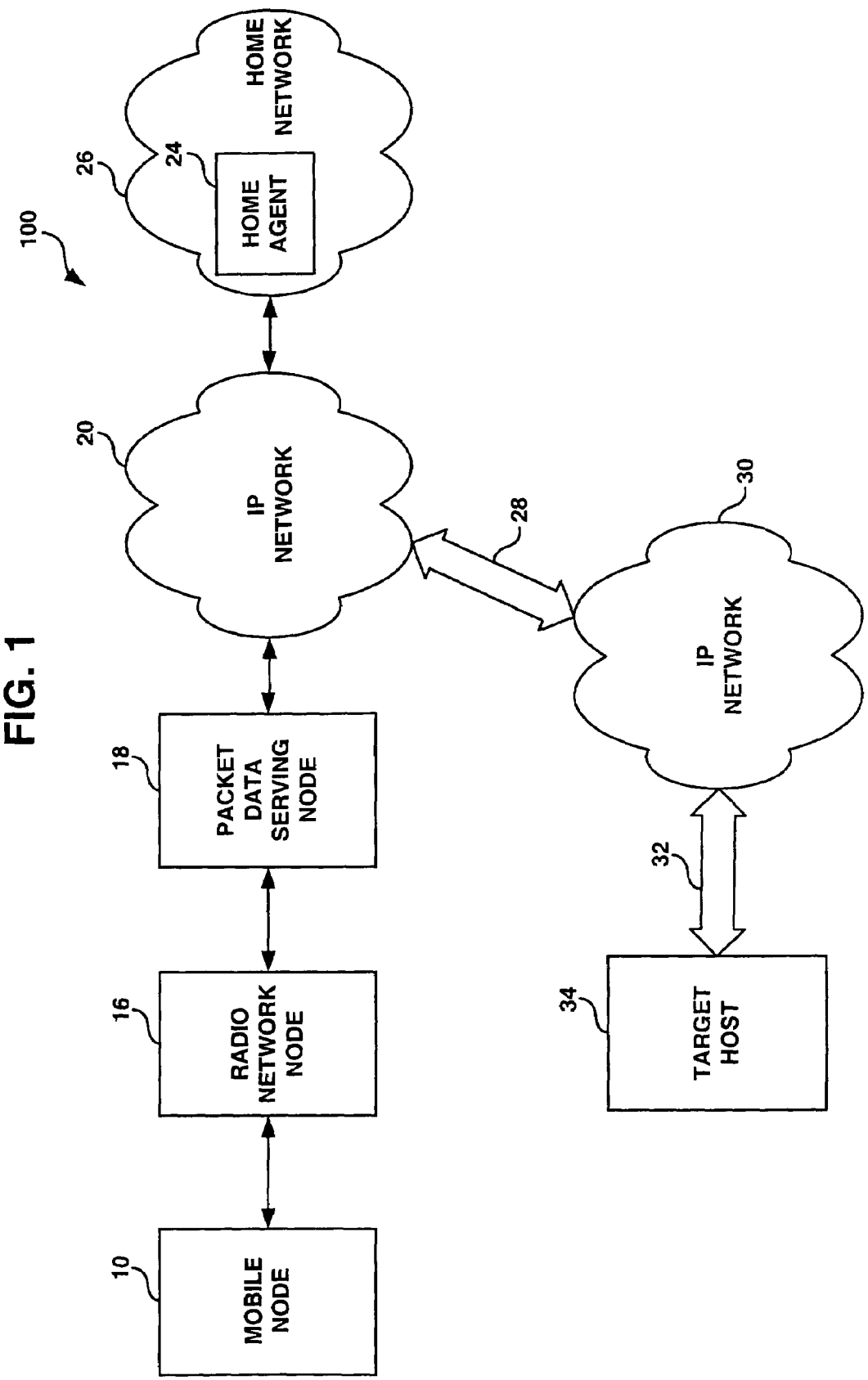
FIG. 1 is a functional block diagram illustrating an example of a prior art mobile IP network architecture.

A MIP registration is conducted with a MIP registration request ("RRQ") 1716 by the mobile node with access-request and access reply communication 1718 between the active PDSN and the HAAA or FAAA followed by communications for MIP RRQ 1720 between the active PDSN and the Home Agent and an MIP registration reply ("RRP") 1722 as previously discussed with respect to FIGS. 1 and 2. Upon transmission of the MIP RRP 1724 by the active PDSN to the mobile node, the standby PDSN is again updated 1726 with the MIP state and the AAA profile as defined in Table 5. User data now begins transmission 1728 between the mobile node and active PDSN with periodic UDR update 1730 to the standby PDSN with accounting data as defined in Table 7. MIP re-registration 1732 will occur periodically during the call repeating the steps 1716, 1718, 1720, 1722 and 1724 which will result in a MIP update 1734 to the standby PDSN with the MIP state. Flow of user data will then continue as shown in step 1736 with periodic UDR updates 1738 to the standby PDSN.

Figure 18:
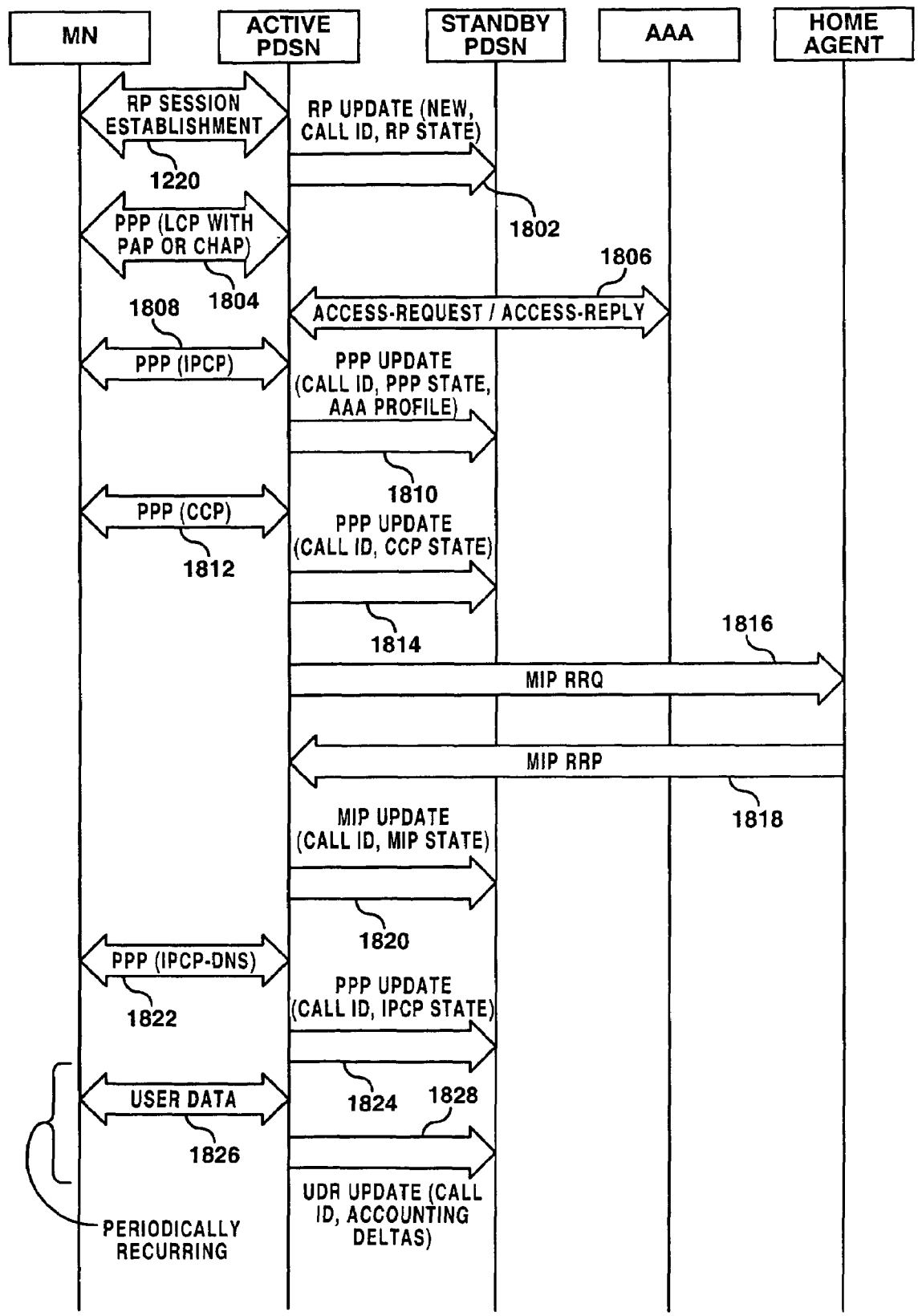
FIG. 18 is a block diagram of a message sequence scenario illustrating standby PDSN updating for a MPA call.

An Mobility Proxy Agent (MPA) call, as shown in FIG. 18, is initially handled in the same manner as a simple IP call. Upon establishment of the session 1220, the active PDSN provides an RP Update 1802 to the standby PDSN. The RP Update includes data for the new call ID and the RP state shown in Table 1. The mobile node establishes a PPP session to the selected PDSN and registers with the selected PDSN as shown in step 1804 including LCP using PAP or CHAP. Access request and access reply communication 1806 is conducted between the active PDSN and the HAAA 216 or FAAA 214 as previously described with respect to FIG. 2. Once IP Control Protocol has been negotiated in the PPP session at step 1808, the active PDSN updates the standby PDSN with the call ID, the PPP state and the AAA profile in step 1810. The PPP state is defined per call and includes the LCP data as defined in Table 2, the PAP/CHAP data defined in Table 3 and the IPCP data shown in Table 4. Again, if CCP is negotiated between the mobile node and active PDSN, as shown in step 1812, a separate PPP update 1814 will be made to the standby PDSN to provide the CCP state as shown in Table 6.

At this point, the active PDSN initiates a proxy MIP session to the HA with MIP RRQ 1816 and MIP RRP 1818. The active PDSN then provides a MIP update 1820 to the standby PDSN and then renegotiates IPCP with the mobile node to transmit the Domain Name System ("DNS") addresses as shown in step 1822. A PPP update 1824 is then provided to the standby PDSN. As with the prior call types, when user data transmission begins, as shown in step 1826, periodic UDR updates 1828 are provided to the standby PDSN with the accounting data shown in Table 7.

For the embodiments disclosed herein, the updates are controlled by events or the PDSN update timer which is a configurable trigger set by the operator. The update timer controls how often accounting data (UDR updates for the prior descriptions with respect to FIGS. 16–19) is communicated to the standby PDSN by the active PDSNs. The events which trigger updates as described for the various call type embodiments and the state update sent to the standby PDSN are summarized in Table 10.

TABLE 10

Update triggers

| Trigger | State sent to standby |
| --- | --- |
| RP connection setup | RP |
| RP re-registration | RP subset |
| RP active start | RP subset, UDR subset |
| RP active stop | RP subset, UDR subset |
| RP SDB | RP subset, UDR subset |
| PPP complete | LCP, PAP/CHAP, IPCP, AAA user profile (if SIP) |
| CCP complete | CCP |
| MIP complete | MIP, AAA user profile |
| MIP re-registration | MIP subset |
| MIP de-registration | MIP |
| IPsec policy file re-read | IPsec policy file |
| PDSN update timer | RP GRE sequence numbers, MIP sequence numbers, UDR subset |

As shown in Table 10, triggers associated with the RP connection result in updates of RP state information and other UDR information if initiated subsequent to establishing the call. Similarly, for Mobile IP calls, elements of the MIP negotiation trigger state updates. Establishing the PPP triggers an update with substantial state data associated with the call.

Call termination provides an additional state update trigger. Upon reception of a call termination indication from an active PDSN, the standby PDSN will delete the call state associated with the terminated call. Call terminations are summarized in Table 11.

TABLE 11

Call termination triggers

Figure 19:
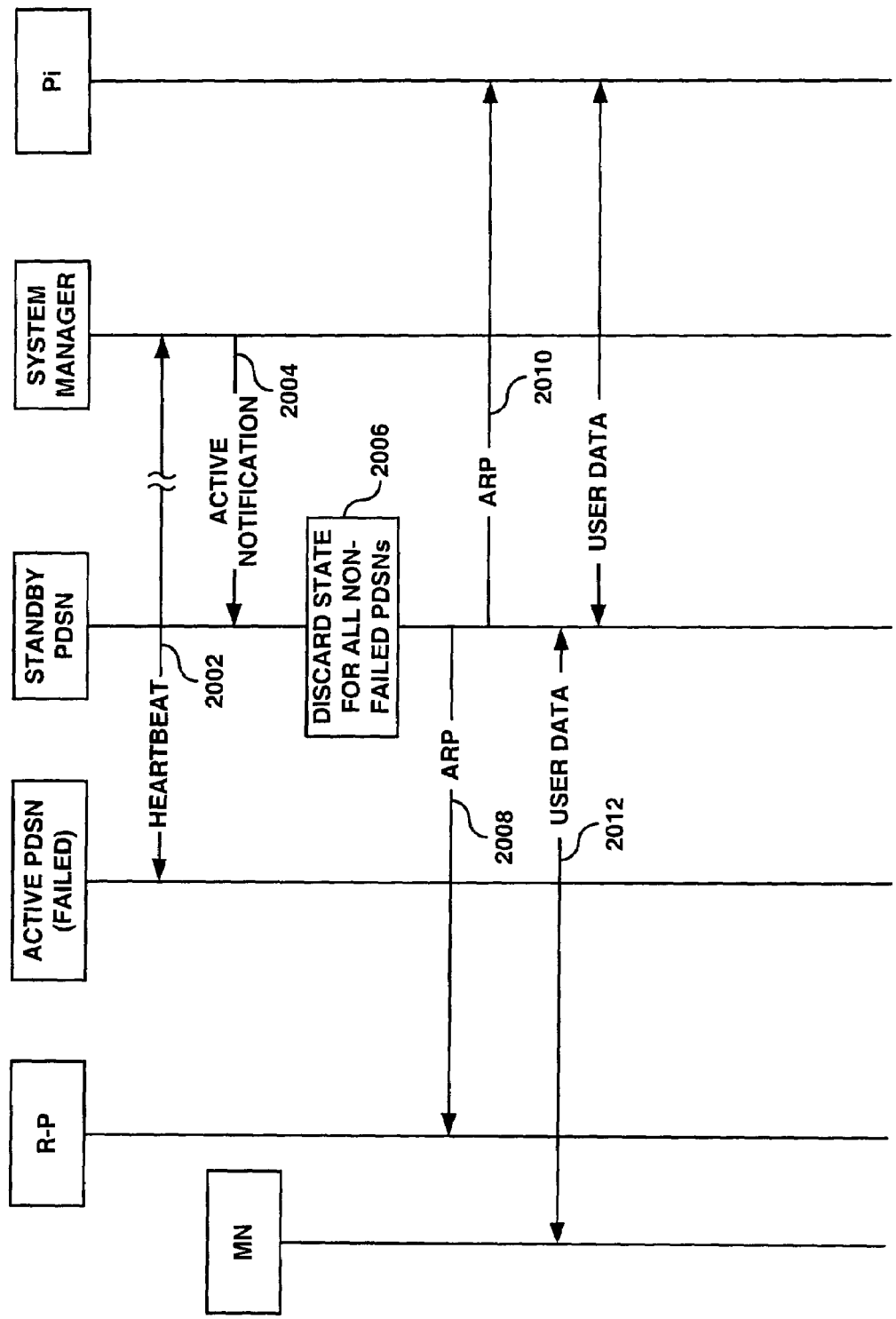
FIG. 19 is a block diagram of a message sequence scenario for failover transfer from the active PDSN to the standby PDSN.

Receiving an LCP-terminate from the mobile node
PCF initiated call termination
RP lifetime expiration
PPP idle timer timeout
PPP session timer timeout
Receiving a MIP registration revocation
MIP deregistration
MIP lifetime expiration
Receiving an AAA disconnect
Administrative disconnect Failover operation of the standby PDSN is shown in FIG. 19. Upon determining through the heartbeat protocol 1902 that on of the N active PDSN's has failed, the system manager notifies the standby PDSN of the failure and assumption of active status for the failed PDSN in step 1904 and notifies the remaining N−1 active PDSN's that the standby PDSN has transitioned to active status to suspend state update transmissions. The standby PDSN discards all state information for the remaining N−1 active PDSNs in step 1906 and sends ARP messages to the RP and Pi interfaces with the failed PDSN's addresses in steps 1908 and 1910 respectively. The standby PDSN then assumes all communication with the mobile node previously handled by the active PDSN in step 1912. IP security ("IPsec") state is reinitialized after a failover occurs. The reinitialization is accomplished pursuant to RFC2409. All static IPsec information in the IPsec policy file which is synchronized upon system startup. Dynamic IPsec information comprises the Internet Key Exchange ("IKE") key, which is returned from the HAAA/FAAA as part of the user profile data (see Table 5 Pre-shared secret).

Figure 20:
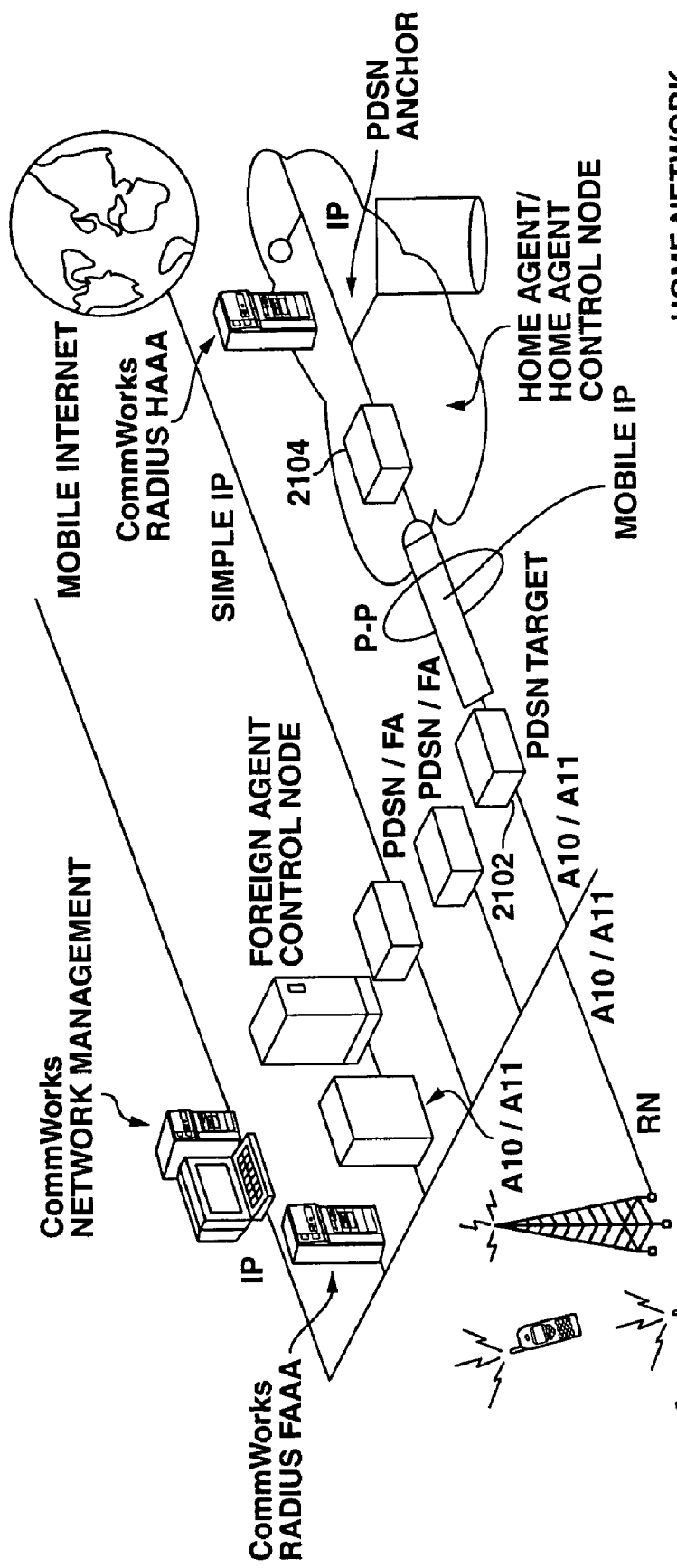
FIG. 20 is a block diagram of a P—P tunnel session.
Figure 21A:
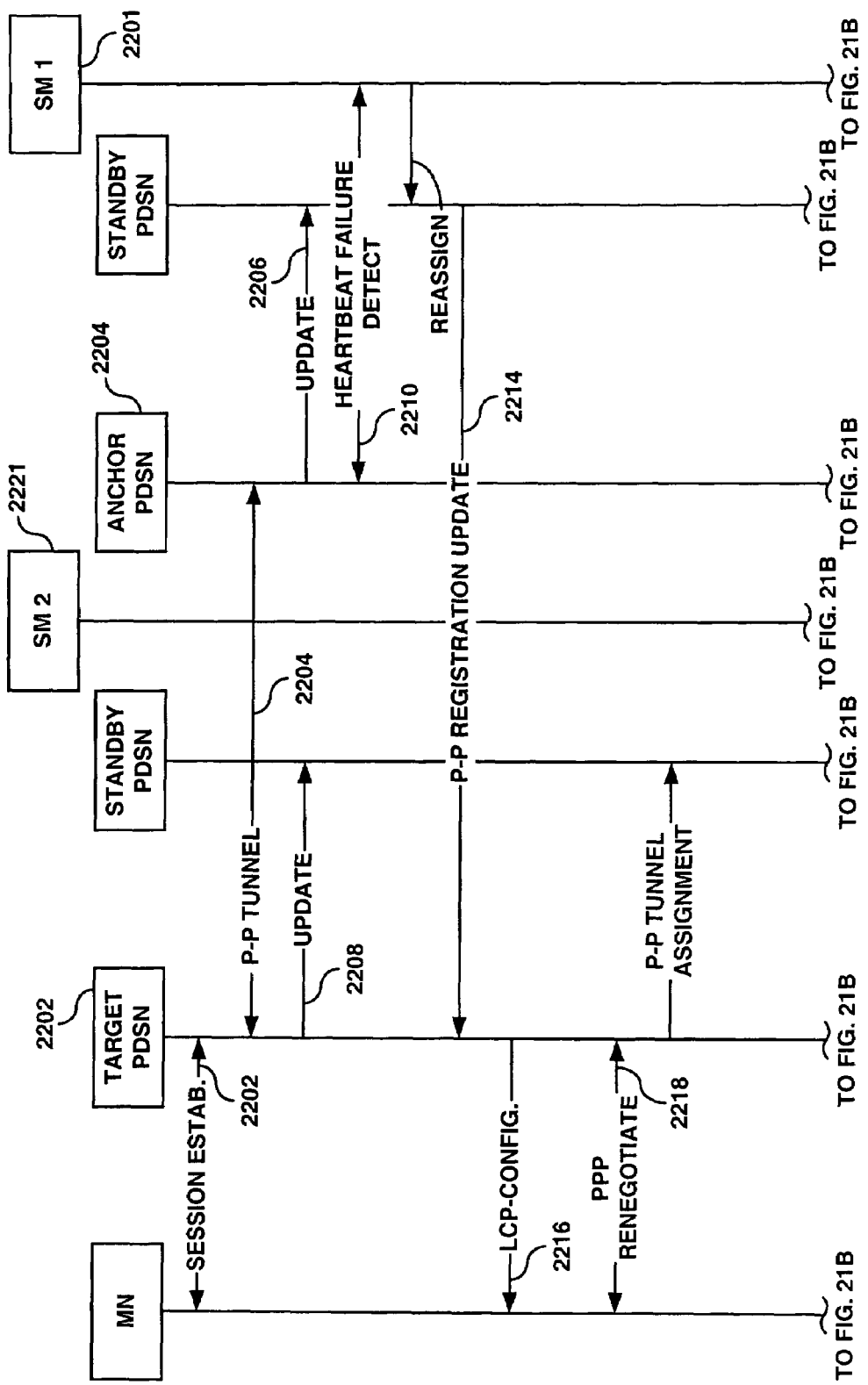

Operation of the standby PDSN in a PDSN to PDSN ("P—P") interface is comparable to previously described scenarios. FIG. 20 shows the target PDSN 2002 and anchor PDSN 2004 in a P—P session. As shown in FIG. 21a, the session is established 2102 by the mobile node with the target PDSN and a P—P tunnel is established 2104 with the anchor PDSN. In the rack or shelf housing the target PDSN after the session is established the update data 2106 is provided to the standby PDSN as shown in Table 12.

TABLE 12

P—P anchor PDSN state

| State | Size |
| --- | --- |
| Target PDSN IP address | 4 bytes |
| Forward direction GRE key | 4 bytes |
| Reverse direction GRE key | 4 bytes |
| Lifetime begin timestamp | 4 bytes |
| Lifetime | 2 bytes |
| Flags | 1 byte |
| Identification | 8 bytes |
| GRE protocol type | 2 bytes |
| MSID (IMSI) | Varies |

Similarly, the update data 2108 provided to the standby PDSN in the rack or shelf housing the target PDSN is shown in Table 13.

TABLE 5

P—P target PDSN state

| State | Size |
| --- | --- |
| Anchor PDSN IP address | 4 bytes |
| Forward direction GRE key | 4 bytes |
| Reverse direction GRE key | 4 bytes |
| Lifetime begin timestamp | 4 bytes |
| Lifetime | 2 bytes |
| Flags | 1 byte |
| Identification | 8 bytes |
| GRE protocol type | 2 bytes |
| MSID (IMSI) | Varies |

Upon the failure of the anchor PDSN 2004 in a P—P tunnel as determined by the system manager 2101 in that rack or shelf through heartbeat communication 2110, the standby PDSN is assigned by the system manager as active in step 2112 and terminates the P—P tunnel by sending a P—P registration update 2114 to the target PDSN 2104 as shown in FIG. 21a. The target PDSN sends an LCP-config 2116 to the mobile forcing a PPP re-negotiation 2118. Similarly, upon the failure of the target PDSN in a P—P tunnel as detected by the system manager 2121 for that rack or shelf through heartbeat communication 2120, the standby PDSN is assigned by the system manager as active in step 2122 and terminates the P—P tunnel by sending a P—P deregistration 2124 to the anchor PDSN as shown in FIG. 21*b*. The standby PDSN acting for the failed target PDSN then sends an LCP-config 2126 to the mobile node forcing a PPP renegotiation 2128. The rapid termination of the P—P tunnel in each case allows the mobile to move it PPP session to the target PDSN in an expedited fashion.

Upon repair or replacement of the failed PDSN, as shown in FIG. 22, the system manager receives a heartbeat detection 2202 and reassigns 2204 the replacement as the standby PDSN with notification 2206 to the active PDSNs of the assignment. The active PDSNs then begin transmission 2208 of update data for each new session established as described above.

Further, alternatively, an N to M redundancy scheme could also be used. In certain of these alternative embodiments, the methods employed for the N to 1 redundancy are expanded for multiple standby units with assignment by the system manager. The N to M redundancy can also be achieved in yet other alternative embodiments by having special purpose modules in the chassis/shelf that store only backup session information and are not used for call processing. In such an embodiment, the backup modules have enough memory to be able to cache both active and dormant sessions and only control information is mirrored to those modules. In such an embodiment, all application modules (PDSNs/HAs) that process call sessions send session information to the redundant modules as the sessions come up, during the state change of the sessions, or when the sessions disconnect, for instance. The redundant modules may arrange the received information for all active application modules. When an application module fails, the system manager may select a backup module from a pre-assigned list of M modules. The system manager may select the backup module based on a relative load of M modules. In such an embodiment, the selected backup module may have to transfer the session information for the failed module from one of the M modules that kept the information. For instance, instead of requesting all call session information, the backup module may request only active session information for a quick switch over, and later could get the dormant session information based on its load. Similarly to the redundancy schemes described in earlier paragraphs, the M backup modules may communicate via the internal media data bus. Further, the selected backup module may send ARP messages to external devices such as routers to assume network interfaces of the failed module.

The embodiment for PDSN redundancy demonstrated above is applicable to generic devices in a PPP communication network. PPP is a layer 2 protocol that a lot of communication systems use to transport layer 3 protocols. The most common layer 3 protocol that is used is the Internet Protocol (IP). There are other protocols that are possible, but are not that commonly used. One such protocol is IPX.

PPP is used over various physical mediums. In addition to these physical mediums, PPP can also be tunneled over other higher layer protocols. An example of a physical medium is a modem dialup link using various modem protocols, like V.35, V.90, et cetera. An example of a tunneling protocol over which PPP is transported is the Layer 2 Tunneling Protocol (L2TP).

PPP over various physical and tunneling mediums is used widely in industry to connect devices in various offerings. Examples of such offerings and devices are DSL where PPP is transported over PPPoE (PPP over Ethernet) to establish a layer 2 link to transport IP packets; RAS where PPP is transported over modem protocols like V.35, V.90, etc.; PDSN where PPP is transported over a Generic Routing Encapsulation (GRE) tunnel as demonstrated in the exemplary embodiments described previously; GGSN where PPP is transported over a GPRS Tunneling protocol (GTP) tunnel; and LNS/LAC where PPP is transported over an Layer 2 Tunneling protocol (L2TP) tunnel.

In all these devices a redundancy scheme is important to provide uninterrupted service. Any redundancy scheme would require the PPP sessions in these devices to be backed up to a standby unit. The PPP procedures between the client device and the Access Devices are identical for all the above mentioned devices. The procedure defined specifically for the PDSN embodiments described above is there applicable as a generic PPP backup procedure for all these devices.

The generic PPP device redundancy scheme for standby backup provides for backing up at least the following modules in a PPP context: Link Control Protocol (LCP) parameters Authentication parameters, Internet Protocol Control Protocol (IPCP) parameters and Compression parameters. In the event of a failure of the primary device, the standby device on which the parameters have been backed up uses the parameters to rebuild the PPP context and take over the role of the failed primary device.

The call flow illustrated in FIG. 23 demonstrates the generic procedures between an active PPP access device 2302 and a backup PPP access device 2304 as provided by the present invention to backup a PPP session. A generic client device 2306 establishes a session with the active access device by medium establishment 2308. The active access device communicates a create context message 2310. The backup access device creates the context 2312 for the session. The client device and active access device establish LCP 2314 after which the active access device provides and LCP update 2316 to the backup access device which then updates the context 2318 stored for the session. The client device and active access device exchange authentication procedures 2320 and the active access device communicates with an authentication device 2322 with confirmation authentication procedures 2324. The active access device and client device then exchange authentication procedures 2326 based on the confirmation from the authentication device. The active access device then provides an authentication update 2328 to the backup access device which correspondingly updates the context 2330 for the session. The active access device and client device then communicate to establish IPCP 2332 and the active access device provides an IPCP update 2334 to the backup access device which again updates the context 2336. The active access device and client device communicate to establish compression protocol 2338 and the active access device again updates 2340 the backup access device which updates the context 2342. User data 2344 then flows between the client device and active access device during normal progression of the session. Upon completion of the session, the client device and active access device communicate to disconnect the session 2346 and the active access device sends and update to the backup access device to delete the context 2348 associated with the terminated session. The backup access device then deletes the context 2350 for that session. In alternative embodiments, the context updates for the LCP, authentication and IPCP states occurs as a single update from the active to the backup access device.

As previously described with respect to the PDSN embodiment, the backup access device can act as backup for multiple active devices. If at any time during the PPP session, the active access device fails, the system manager for the access devices activates the backup access device to assume communication with the client device as previously described for the PDSN embodiment with respect to FIG. 19.

It should be understood that the programs, processes, methods and systems described herein are not related or limited to any particular type of computer or network system (hardware or software), unless indicated otherwise. Various types of general purpose or specialized computer systems supporting the IP networking may be used with or perform operations in accordance with the teachings described herein. The disclosed embodiments for a PDSN herein provide a single integrated card. However, the processes and methods described are equally applicable to embodiments employing multiple blades in a communication chassis providing PDSN functionality in the form of an interface function, a call processing function and a data forwarding function as elements combined to create a PDSN. The described redundancy methods and communication described and claimed herein are applicable for the functional elements separately as well as for the PDSN as an integral entity.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, more or fewer steps may be used, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for packet data serving node redundancy in an Internet Protocol network, comprising the steps of:
    providing an access node comprising a plurality of N+1 packet data serving nodes and at least one system manager;
    selecting one packet data serving node from the N+1 packet data serving nodes as a standby;
    making the remaining N packet data serving nodes from the N+1 packet data serving nodes active;
    receiving from a radio node a registration request to establish a communication session between a packet data serving node and a mobile node;
    selecting an active packet data serving node;
    sending a registration reply message from the selected packet data serving node (PDSN) to the radio node;
    establishing a communication session between the mobile node and the selected PDSN;
    transmitting state data from the selected PDSN to the standby PDSN;
    periodically updating state data from the selected PDSN to the standby PDSN; and
    transferring the communication session to the standby PDSN upon failure of the selected PDSN.

2. A method for packet data serving node redundancy in an Internet Protocol network as defined in claim 1 wherein each active PDSN, upon selection, transmits non-recoverable state data to the standby PDSN and periodically updates non-recoverable state data to the standby PDSN.

3. A method for packet data serving node redundancy in an Internet Protocol network as defined in claim 1 wherein the step of transmitting state data includes transmitting data for a Radio Network—Packet Data Serving Node (RP) interface state.

4. A method for packet data serving node redundancy in an Internet Protocol network as defined in claim 1 further including the step of completing IP Control Protocol (IPCP) negotiation between the selected PDSN and the mobile node and wherein the step of periodically updating includes the steps of:
    transmitting a Point to Point Protocol (PPP) state; and
    transmitting an Authentication, Authorization and Accounting (AAA) profile.

5. A method for packet data serving node redundancy in an Internet Protocol network as defined in claim 4 wherein the step of periodically updating further includes the step of transmitting a Compression Control Protocol (CCP) state.

6. A method for packet data serving node redundancy in an Internet Protocol network as defined in claim 4 wherein the step of transmitting the PPP state comprises the steps of:
    transmitting a Link Control Protocol (LCP) state;
    transmitting an authentication protocol state; and,
    transmitting an IPCP state.

7. A method for packet data serving node redundancy in an Internet Protocol network as defined in claim 4 wherein the mobile node is a Mobile IP (MIP) application and wherein the step of transmitting the PPP state comprises the steps of:
    transmitting a Link Control Protocol (LCP) state; and,
    transmitting an LPCP state.

8. A method for packet data serving node redundancy in an Internet Protocol network as defined in claim 6 wherein the mobile node is a Mobility Proxy Agent (MPA) application and further includes the steps of:
    initiating a proxy Mobile IP (MIP) session between the selected PDSN and a home agent; and
    re-negotiating IPCP with the mobile node to transmit the Domain Name System addresses;
    and the step of periodically updating further includes the steps of:
    transmitting the MIP state after initiating the proxy session; and
    transmitting the PPP state after re-negotiating the IPCP.

9. A method for packet data serving node redundancy in an Internet Protocol network as defined in claim 1 wherein the step of periodically updating further includes the step of synchronizing Usage Date Record (UDR) information.

10. A method for packet data serving node redundancy in an Internet Protocol network as defined in claim 9 wherein the step of synchronizing UDR information is triggered by an update timer.

11. A method for packet data serving node redundancy in an Internet Protocol network as defined in claim 7 further comprising the steps of:
    sending an agent advertisement from the selected PDSN to the mobile node;
    updating the MIP state on the standby PDSN;
    sending a MIP registration request (RRQ) from the mobile node completing access request and access reply communication between the selected PDSN and a Home Authentication, Accounting and Authorization server (HAAA);

sending a MIP RRQ from the selected PDSN to a home agent;

receiving an MIP registration reply (RRP) from the home agent to the selected PDSN;

transmitting the MIP RRP from the selected PDSN to the mobile node; and updating the standby PDSN with the MIP state.

12. A method for packet data serving node redundancy in an Internet Protocol network as defined in claim 11 further comprising the steps of:

conducting MIP re-registration periodically during the call; and updating the standby PDSN with the MIP state.

13. A method for packet data serving node redundancy in an Internet Protocol network as defined in claim as defined in claim 1 wherein the step of periodically updating is triggered by any one of a plurality of predefined update triggers.

14. A method for packet data serving node redundancy in an Internet Protocol network as defined in claim 1 wherein the step of transferring the communications session includes the steps of:

detecting failure of the selected PDSN;

deleting call information in the standby PDSN for all PDSNs other than the failed selected PDSN;

assuming communications with the mobile node using the standby PDSN.

15. A method for packet data serving node redundancy in an Internet Protocol network as defined in claim 14 wherein the step of detecting failure comprises the steps of:

receiving a heart beat signal from the selected PDSN by the system manager;

detecting a loss of the heart beat signal;

notifying the standby PDSN of active status with address information of the failed selected PDSN; and notifying the remaining active PDSNs of reassignment of the standby PDSN to active status.

16. A method for packet data serving node redundancy in an Internet Protocol network as defined in claim 14 wherein a PDSN to PDSN (P—P) tunnel has been established, the step of assuming communications includes the step of forcing a new PPP negotiation by the mobile node.

17. A method for packet data serving node redundancy in an Internet Protocol network as defined in claim 16 wherein the failed PDSN is an anchor PDSN in the P—P tunnel and the step of forcing a new PPP negotiation comprises the steps of:

sending a P—P registration update to a target PDSN; and, sending a message requiring renegotiation from the target PDSN to the mobile node.

18. A method for packet data serving node redundancy in an Internet Protocol network as defined in claim 16 wherein the failed PDSN is a target PDSN in the P—P tunnel and the step of forcing a new PPP negotiation comprises the steps of:

sending a message requiring renegotiation from the standby PDSN to the mobile node; and, renegotiating the PPP to establish a new P—P tunnel.

19. A method for packet data serving node redundancy in an Internet Protocol network as defined in claim 15 comprising the additional steps of:

detecting a heartbeat signal for a replacement PDSN by the system manager;

assigning the replacement PDSN as a standby PDSN;

notifying the active PDSNs of the standby PDSN assignment; and, transmitting state updates from the active PDSNS to the standby PDSN for each new call session established.

20. A method for Point to Point Protocol (PPP) communications elements redundancy in an Internet Protocol network comprising the steps of:

providing a communications node comprising a plurality of N+1 elements and at least one system manager;

selecting one element from the N+1 elements as a standby;

making the remaining N elements active;

establishing a communication session with a PPP client using one selected active element;

transmitting state data from the one selected active element to the standby element;

periodically updating state data from the one selected active element to the standby element; and transferring the communication session to the standby element upon failure of the one selected active element.

21. A method for packet data serving node redundancy in an Internet Protocol network, comprising the steps of:

providing an access node comprising a plurality of N+1 packet data serving nodes and at least one system manager;

selecting one packet data serving node from the N+1 packet data serving nodes as a standby;

making the remaining N packet data serving nodes from the N+1 packet data serving nodes active;

receiving from a radio node a registration request to establish a communication session between a first packet data serving node and a mobile node;

sending a registration reply message from the first packet data serving node to the radio node;

establishing a communication session between the mobile node and the first packet data serving node; and transmitting selected non-recoverable call information data from the first selected packet data serving node to the standby packet data serving node responsive to any one of a predetermined set of update triggers.

22. A method for packet data serving node redundancy in an Internet Protocol network as defined in claim 21 wherein the update triggers are Radio Network PDSN (RP) interface triggers and the call information data includes an RP interface state.

23. A method for packet data serving node redundancy in an Internet Protocol network as defined in claim 21 wherein the update trigger is completion of the Point-to-Point Protocol and the call information data includes Link Control Protocol (LCP) state and authentication state.

24. A method for packet data serving node redundancy in an Internet Protocol network as defined in claim 23 wherein the call information data further includes Authentication, Authorization and Accounting (AAA) user profile data.

25. A method for packet data serving node redundancy in an Internet Protocol network as defined in claim 21 wherein the mobile node is a Mobile IP (MIP) application and the trigger is a MIP registration event and wherein the call information data includes MIP state.

26. A method for packet data serving node redundancy in an Internet Protocol network as defined in claim 25 wherein the call information data further includes Authentication, Authorization and Accounting (AAA) user profile data.

27. A method for packet data serving node redundancy in an Internet Protocol network as defined in claim 21 wherein the trigger is expiration of a PDSN update timer and the call information data includes user data.

28. A method for packet data serving node redundancy in an Internet Protocol network as defined in claim 27 wherein the call information data further includes RP state.

29. A method for packet data serving node redundancy in an Internet Protocol network as defined in claim 27 wherein the mobile node is a MIP application and the call information data further includes MIP state.

30. A method for packet data serving node redundancy in an Internet Protocol network as defined in claim 21 wherein the call update triggers include call termination triggers.

31. A method for packet data serving node redundancy in an Internet Protocol network as defined in claim 30 comprising the additional step of deleting call state information in the standby PDSN for a terminated call upon receiving a termination trigger.

* * * * *